United States Patent
Jung

(10) Patent No.: US 9,277,464 B2
(45) Date of Patent: Mar. 1, 2016

(54) INTERWORKING METHOD AND DEVICE BETWEEN BASE STATIONS USING GATEWAY IN WIRELESS COMMUNICATION SYSTEM OF HIERARCHICAL CELL STRUCTURE

(75) Inventor: Jae-Yong Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 411 days.

(21) Appl. No.: 13/978,471

(22) PCT Filed: Jan. 6, 2012

(86) PCT No.: PCT/KR2012/000162
§ 371 (c)(1),
(2), (4) Date: Jul. 5, 2013

(87) PCT Pub. No.: WO2012/093893
PCT Pub. Date: Jul. 12, 2012

(65) Prior Publication Data
US 2013/0281097 A1 Oct. 24, 2013

(30) Foreign Application Priority Data
Jan. 6, 2011 (KR) .......................... 10-2011-0001200

(51) Int. Cl.
H04W 8/26 (2009.01)
H04W 36/00 (2009.01)
H04W 88/16 (2009.01)
H04W 92/20 (2009.01)

(52) U.S. Cl.
CPC ...... *H04W 36/0066* (2013.01); *H04W 36/0072* (2013.01); *H04W 88/16* (2013.01); *H04W 92/20* (2013.01)

(58) Field of Classification Search
CPC ....... H04L 47/24; H04L 31/048; H04L 31/05; H04L 31/1896; H04W 24/04; H04W 28/08; H04W 4/00; H04W 4/18; H04W 76/062; H04W 84/045; H04W 8/082; H04W 92/045; H04W 76/02; H04W 88/16; H04W 92/00; H04W 92/12
See application file for complete search history.

(56) References Cited

U.S. PATENT DOCUMENTS

| | | |
|---|---|---|
| 2010/0169412 A1 | 7/2010 | Gupta |
| 2010/0260168 A1 | 10/2010 | Gheorghiu et al. |
| 2011/0237258 A1* | 9/2011 | Nylander ............ H04J 11/0093 455/437 |
| 2013/0034058 A1* | 2/2013 | Xi ........................ H04W 92/12 370/328 |

FOREIGN PATENT DOCUMENTS

WO    2009/045007 A1    4/2009

* cited by examiner

*Primary Examiner* — Quan M Hua
(74) *Attorney, Agent, or Firm* — Jefferson IP Law, LLP

(57) ABSTRACT

A method and an apparatus for interworking between base stations using a GateWay (GW) in a wireless communication system of a hierarchical cell structure are provided. In the method, a message requesting Internet Protocol (IP) information of a target eNB is received from a source eNB. The IP information of the target eNB is obtained. The source eNB is mapped to the target eNB and the mapping is stored. IP information of the GW is transmitted to the source eNB instead of the IP of the target eNB.

15 Claims, 17 Drawing Sheets

INTERWORKING METHOD AND DEVICE BETWEEN BASE STATIONS USING GATEWAY IN WIRELESS COMMUNICATION SYSTEM OF HIERARCHICAL CELL STRUCTURE

BACKGROUND OF THE INVENTION

1. Field of the Invention

The present invention relates to a wireless communication system having a hierarchical cell structure. More particularly, the present invention relates to a method and an apparatus for X2 interwork between eNBs using a gateway.

2. Description of the Related Art

A Long Term Evolution (LTE) system provides an S1 handover using an S1 interface between a Mobility Management Entity/Serving-GateWay (MME/S-GW) and an eNB and an X2 handover using an X2 interface between eNBs. However, since the S1 handover is performed via an MME/S-G, it may generate an overhead to a core network and a handover delay time increases, so that the X2 handover between eNBs is preferred.

Meanwhile, recently, for swift communication of user equipment (UE), a wireless communication system provides a wireless communication system of a hierarchical cell structure where eNBs having different cell coverages co-exist. For example, a wireless communication system provides a communication system where a small cell like a pico cell and a macro cell co-exist. Particularly, the current LTE-A standard discusses an alternative for improving an entire system performance using a small eNB.

FIG. 1 illustrates a general LTE system configuration.

Referring to FIG. 1, the LTE system includes macro base stations (eNBs) 100-1 to 100-3, small base stations (pico eNBs or home eNBs) 110-1 to 110-4, an MME/S-GWs 120-1 and 120-2 which are core networks, and a small gateway (pico GW or home GW) 130. Here, the macro eNBs 100-1 to 100-3 interwork using the MME/S-GWs 120-1 and 120-2 and an S1 interface, and the home eNBs 110-1 to 110-4 operate by interworking using the pico GW 130 and an S1 interface in order to minimize an influence of the core network. Particularly, referring to the LTE system standard, the macro eNBs 100-1 to 100-3 and home eNBs 110-1 to 110-4 are defined to operate by connecting with an X2 interface via the small GW 130.

However, since the standard does not describe a specific alternative for connecting with the X2 interface via the small GW, a specific alternative needs to be proposed.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for X2 interwork between eNBs using a small GW in a wireless communication system having a hierarchical cell structure.

Another aspect of the present invention is to provide a method and an apparatus for transmitting, at a small GW, information of the GW to each eNB instead of information of a counterpart eNB in a wireless communication system having a hierarchical cell structure.

Still another aspect of the present invention is to provide a method and an apparatus for connecting, at a small GW, with each eNB via one X2 interface to provide an X2 interface with a plurality of other eNBs to the each eNB.

In accordance with an aspect of the present invention, a method of a GateWay (GW) for X2 interwork between eNBs in a wireless communication system of a hierarchical cell structure is provided. The method includes receiving a message requesting Internet Protocol (IP) information of a target eNB from a source eNB, obtaining the IP information of the target eNB, mapping the source eNB to the target eNB and storing the same, and transmitting IP information of the GW to the source eNB instead of the IP of the target eNB.

In accordance with another aspect of the present invention, an apparatus of a GateWay (GW) for X2 interwork between eNBs in a wireless communication system of a hierarchical cell structure is provided. The apparatus includes a receiver for receiving a message requesting Internet Protocol (IP) information of a target eNB from a source eNB, an X2 information manager for obtaining the IP information of the target eNB, mapping the source eNB to the target eNB, and storing the same, and a transmitter for transmitting IP information of the GW to the source eNB instead of the IP of the target eNB.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Exemplary embodiments of the present invention provide a method and an apparatus for X2 interwork between eNBs using a small GW in a wireless communication system having a hierarchical cell structure. Here, X2 denotes an interface for exchanging cell and neighbor cell information between eNBs and supporting a handover to guarantee mobility of UE while minimizing the load of a core network. Hereinafter, the present invention exemplarily describes a pico eNB (PeNB) as a small eNB. The present invention is also applicable to other small eNBs, for example, a Home eNB (HeNB). Also, the present invention exemplarily describes a pico GW as a small GW. The present invention is also applicable to other small GWs, for example, a home GW.

Figure 1:
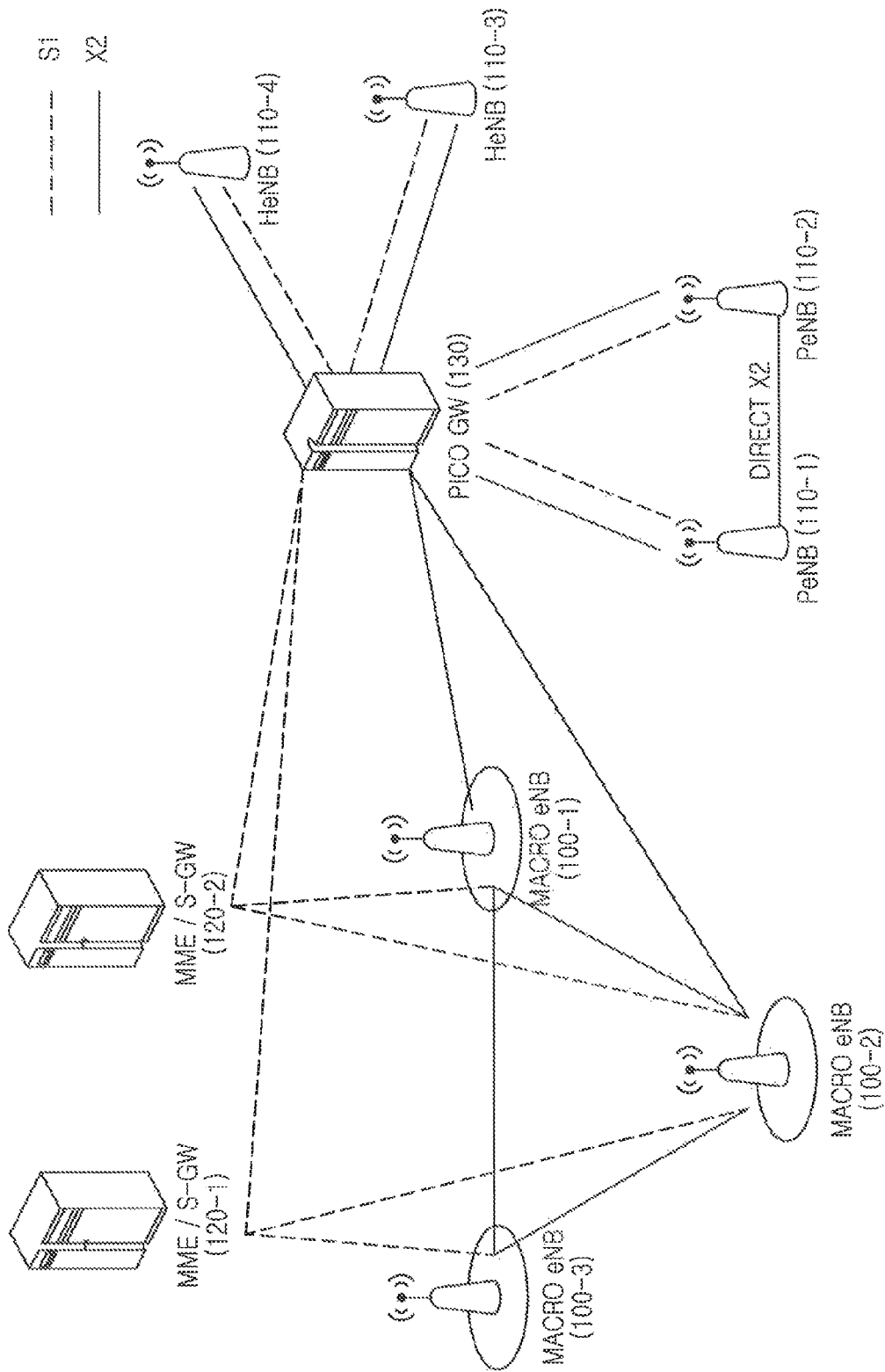
FIG. 1 is a view illustrating a general LTE system configuration.
Figure 2:
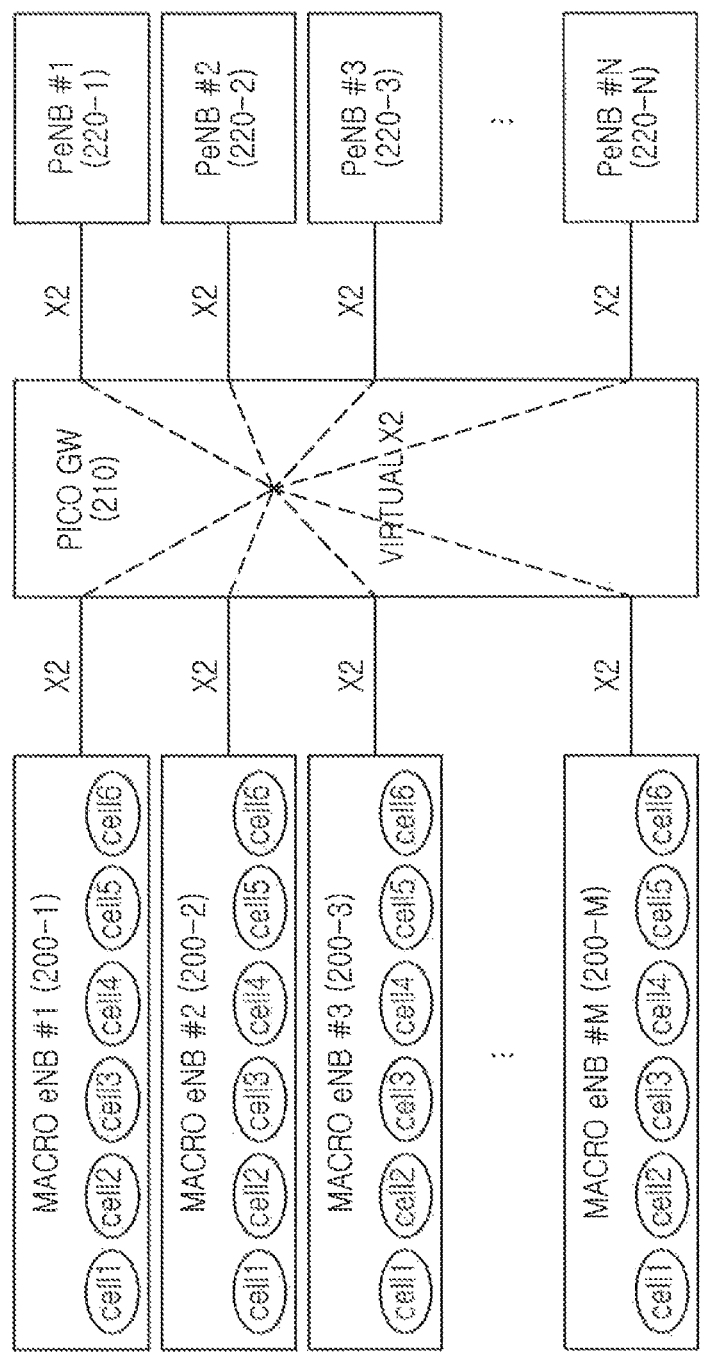
FIG. 2 is a view illustrating an X2 interworking method between eNBs via a pico GW in a wireless communication system having a hierarchical cell structure according to the present invention.

FIG. 2 is a view illustrating an X2 interworking method between eNBs via a small GW in a wireless communication system having a hierarchical cell structure according to the present invention.

Referring to FIG. 2, each of a plurality of macro eNBs 200-1 to 200-M connects with a pico GW 210 using one X2 interface. Each of the plurality of macro eNBs 200-1 to 200-N transmits a message requesting the IP information of a target eNB to the pico GW 210, and receives the IP information of the pico GW 210 from the pico GW 210 to connect with the pico GW 210 using the X2 interface. Each of the plurality of macro eNBs 200-1 to 200-M is connected using the X2 interface, and then exchanges cell information with the target eNB via the X2 interface. Also, when receiving a message requesting IP information from the pico GW 210, each of the plurality of macro eNBs 200-1 to 200-M transmits the IP information of itself to the pico GW 210.

Next, each of a plurality of pico eNBs 220-1 to 220-N connects with the pico GW 210 using one X2 interface. Each of the plurality of pico eNBs 220-1 to 220-N transmits a message requesting the IP information of a target eNB to the pico GW 210, and receives the IP information of the pico GW 210 from the pico GW 210 to connect with the pico GW 210 using the X2 interface. Each of the plurality of pico eNBs 220-1 to 220-N is connected using the X2 interface, and then exchanges cell information with the target eNB via the X2 interface. Also, When receiving a message requesting IP information from the pico GW 210, each of the plurality of pico eNBs 220-1 to 220-N transmits the IP information of itself to the pico GW 210.

The pico GW 210 is located between the pico eNBs 220-1 to 220-N and the MME/S-GW to operate as if it were the MME/S-GW with respect to the pico eNBs 220-1 to 220-N and operate as if it were the pico eNBs 220-1 to 220-N with respect to the MME/S-GW. The pico GW 210 interworks with the pico eNBs and the MME/S-GW via an S1 interface, and provides a line concentration function and a dispersion function for the pico eNBs.

Particularly, according to the present invention, the pico GW 210 connects the X2 interface with each of the plurality of macro eNBs 200-1 to 200-M and the plurality of pico eNBs 220-1 to 220-N. When the IP information of a target eNB is requested by the plurality of macro eNBs 200-1 to 200-M and the plurality of pico eNBs 220-1 to 220-N, the pico GW 210 obtains the IP information of the target eNB, maps a source eNB that has requested the IP information to the target eNB and stores the same, and transmits the IP information of the pico GW 210 to the source eNB instead of the IP in formation of the target eNB to connect the source eNB with the X2 interface. Here, since the pico GW 210 manages pico eNBs via the S1 interface, the pico GW can know the IP information of the pico eNBs. Therefore, in the case where the target eNB is a pico eNB or a macro eNB which has been connected via the X2 interface previously, since the pico GW 210 stores the IP information of the target eNB in advance, the pico GW 210 does not perform an IP obtain procedure separately. In contrast, in the case where the target eNB is a macro eNB which has not been connected via the X2 interface previously, the pico GW 210 should perform a procedure for requesting the macro eNB which is the target eNB to transmit IP information via the S1 interface and receiving the IP information.

After that, when receiving a message for exchanging cell information from a source eNB which has been connected via the X2 interface, the pico GW 210 retrieves a target eNB mapped to the source eNB and then transmits the cell information of the source eNB to the retrieved target eNB, and receives the cell information of the target eNB to transmit the same to the source eNB.

In the above description, the pico GW 210 provides a function that allows the source eNB and the target eNB to be connected using X2 interface by transmitting the IP of the pico GW 210 to the source eNB instead of the IP of the target eNB and storing information representing connection between the source eNB and the target eNB. That is, the source eNB physically connects with the pico (GW 210 via the X2 interface, but the source eNB is connected with the target eNB inside the pico GW 210, so that the source eNB can operate as if it were directly connected with the target eNB using the X2 interface logically. Therefore, the pico GW 210 operates as an eNB representing the plurality of pico eNBs 220-1 to 220-N with respect to the macro eNBs 200-1 to 200-M, and operates as an eNB representing other pico eNBs excluding a relevant pico eNB and the plurality of macro eNBs 200-1 to 200-M with respect to each of the plurality of pico eNBs 220-1 to 220-N. At this point, for X2 connection with a target eNB, the pico eNB and the macro eNB according to the present invention operate in the same way as in the conventional art.

Figure 3:
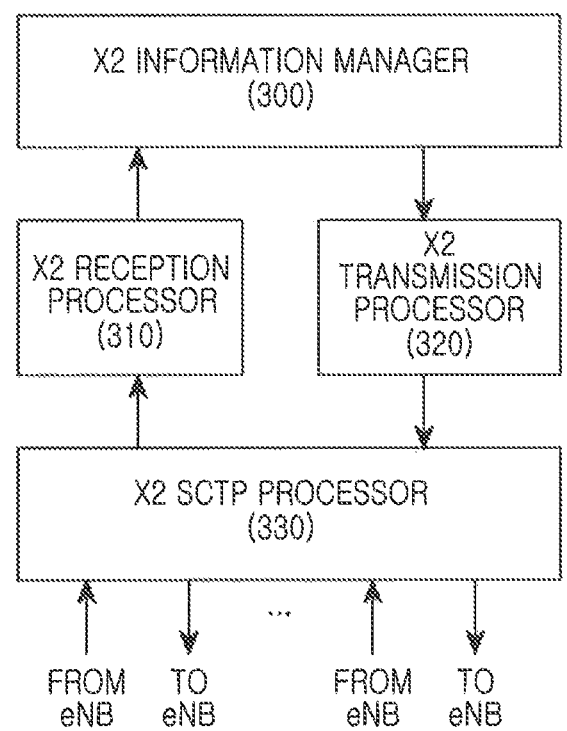
FIG. 3 is a block diagram illustrating a pico GW in a wireless communication system having a hierarchical cell structure according to the present invention.

FIG. 3 is a block diagram illustrating a pico GW in a wireless communication system having a hierarchical cell structure according to the present invention.

Referring to FIG. 3, the pico GW includes an X2 information manager 300, an X2 reception processor 310, an X2 transmission processor 320, and an X2 SCTP processor 330.

The X2 information manager 300 stores and manages information regarding eNBs to be connected via the X2 interface. That is, when receiving a message requesting the IP information of a target eNB from a source eNB, the X2 information manager 300 controls and processes a function for obtaining IP information of the target eNB, and maps source eNB information to target eNB information to store the same to represent the two eNBs are eNBs connected via the X2 interface. Here, the source eNB information and the target eNB information are information for identifying the source eNB and the target eNB and may be one of a base station ID, an eNB ID, and a global eNB ID defined separately. Here, the X2 information manager 300 can obtain and store the IP information of pico eNBs via the S1 interface in advance. Therefore, in the case where a target eNB is a pico eNB or a macro eNB which has been connected via the X2 interface previously, since the X2 information manager 300 stores the IP information of the target eNB in advance, the X2 information manager 300 does not perform an IP obtain procedure separately. In contrast, if the target eNB is a macro eNB which has not been connected via the X2 interface previously, the X2 information manager 300 controls and processes a function for requesting the macro eNB which is the target eNB to transmit IP information via the S1 interface and receiving the IP information. At this point, for a message requesting IP information of the target eNB, a conventionally well known configuration transfer message can be used.

The X2 information manager 300 obtains the IP information of the target eNB and then transmits the IP information of itself to the source eNB instead of the IP of the target eNB, and controls and processes a function for connecting with the source eNB via the X2 interface. At this point, the X2 interface is connected based on a Stream Control Transmission Protocol (SCTP).

When receiving a message for exchanging cell information from the source eNB which has been connected via the X2 interface, the X2 information manager 300 controls a function for retrieving a target eNB mapped to the source eNB to transmit the cell information of the source eNB to the target eNB and receiving the cell information of the target eNB. At this point, the X2 information manager 300 processes to exchange cell information using an X2 setup request message or a configuration update message depending on whether it is connected with the relevant eNB via the X interface. Also, at this point, the exchanged cell information may be a global eNB ID and served cells information. Here, the served cells information includes the cell information of the relevant eNB and neighbor cell information.

The X2 reception processor 310 is provided with a signal received via the X2 interface from the X2 SCTP processor 330 and analyzes the received signal according to a predetermined method to provide the same to the X2 information manager 300. The X2 transmission processor 320 transmission-processes a signal provided from the X2 information manager 300 according to a predetermined method to provide the same to the X2 SCTP processor 330.

The X2 SCTP processor 330 changes a signal provided from the X2 transmission processor 320 to an XCTP packet and transmits the same to a relevant eNB, and analyzes an XCTP packet received from a different eNB to provide the same to the X2 reception processor 310.

Also, though not shown, the pico GW has a transceiver for receiving a signal transmitted/received via the S1 interface to transmit/receive a signal to/from an MME and a pico eNB connected via the S1 interface under control of the X2 information manager 300.

Figure 4:
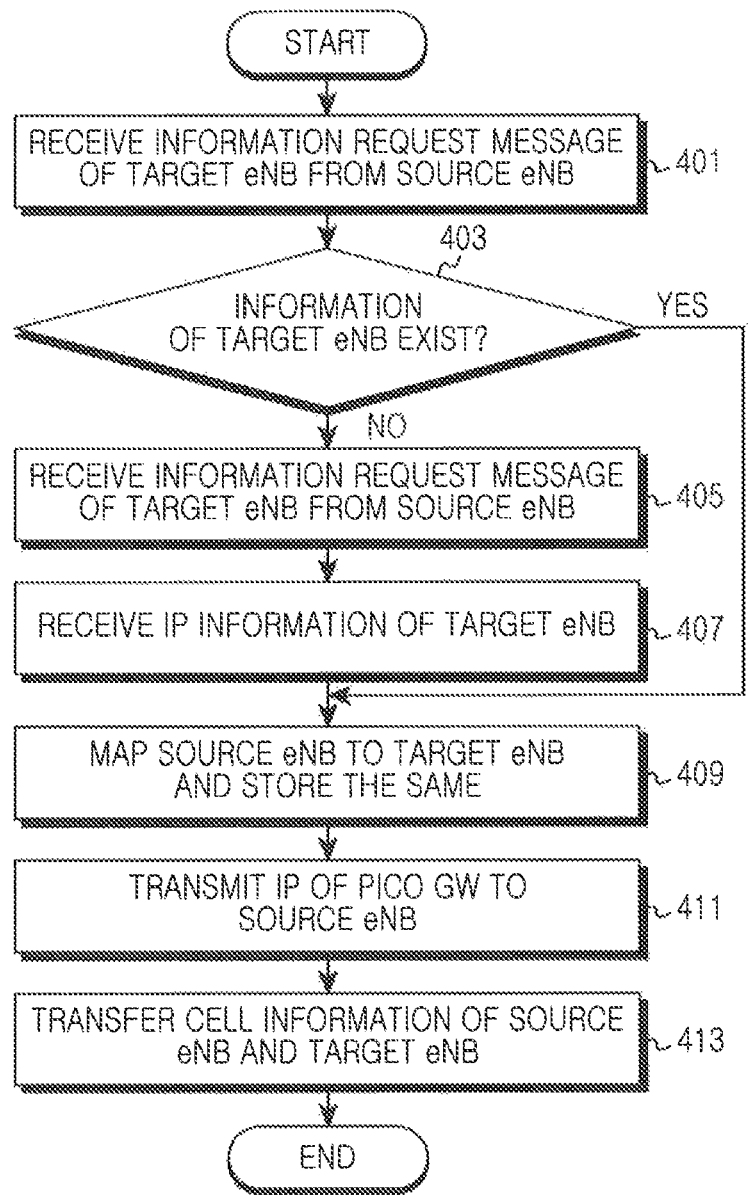
FIG. 4 is a view illustrating an operation procedure of a pico GW in a wireless communication system having a hierarchical cell structure according to an embodiment of the present invention.

FIG. 4 is a view illustrating an operation procedure of a pico GW in a wireless communication system having a hierarchical cell structure according to an embodiment of the present invention.

Referring to FIG. 4, the pico GW receives a message requesting the information of a target eNB from a source eNB in step 401. At this point, the message requesting the information of the target eNB is a configuration transfer message transmitted/received via the S1 interface, and can include an identifier of the source eNB, a Tracking Area Identity (TAI) of the source eNB, an identifier of the target eNB, and a TAI of the target eNB. Here, the identifier of the source eNB and the identifier of the target eNB are identifiers that can discriminate a relevant eNB, and one of a base station eNB ID, a global eNB ID, and an eNB ID defined separately, can be used.

The pico GW determines whether the information, that is, the IP information of the target eNB is stored in advance in step 403. Here, the pico GW can obtain and store the IP information of all pico eNBs and the IP information of a macro eNB connected via the X2 interface previously in advance. In contrast, the pico GW does not store the IP information of the macro eNB not connected via the X2 interface previously in advance.

When the IP information of the target eNB is stored in advance, the pico GW proceeds to step 409. When the IP information of the target eNB is not stored in advance, the pico GW transmits a message requesting the IP information to the target eNB. At this point, the IP request message transmitted to the target eNB by the pico GW includes both source eNB information and the target eNB information included in the message received in step 401 and can be transmitted to a relevant macro eNB via an MME.

After that, the pico GW receives a response message including the IP information of the target eNB from the target eNB in step 407, and maps the source eNB to the target eNB and stores the same to present the two eNBs are eNBs connected via the X2 interface in step 409. Here, the pico GW receives the IP information of the target eNB via a configuration transfer message. At this point, the configuration transfer message is transmitted/received via the S1 interface.

After that, the pico GW transmits the IP of the pico GW to the source eNB via the S1 interface in step 411.

After that, the pico GW transfers the cell information of the source eNB and the target, eNB via the X2 interface with the source eNB and the target eNB in step 413. Here, the pico (GW can transfer the cell information of the source eNB to the target eNB and transfer the cell information of the target eNB to the source eNB using a setup request/setup response message that uses X2 or a configuration update/configuration update ack message that uses X2 depending on whether a relevant eNB is connected via the X2 interface previously or connected via the X2 interface initially. That is, in the case where the pico GW is connected with the relevant eNB via the X2 interface initially, the pico GW can exchange the cell information using the setup request/setup response message. In the case where the pico GW is already connected with the relevant eNB via the X2 interface, the pico GW can exchange the cell information using the configuration update/configuration update ack message. Here, the cell information exchanged between the source eNB and the target eNB includes a global eNB ID and served cells information. The served cells information denotes cell information of the relevant eNB and neighbor cell information. Also, here, in the case where the pico GW is already connected with the relevant eNB via the X2 interface, the pico GW can generate a configure update message including only neighbor cell information required by a counterpart eNB to transmit the same.

After that, the pico GW ends the algorithm according to the present invention.

Then, based on the operation of the above-described pico GW, various cases for connecting the X2 interface between eNBs in a wireless communication system of a hierarchical cell structure according to the present invention is described below with reference to FIGS. 5 to 17.

FIGS. 5 to 17 illustrate an X2 interworking method using a pico GW in a wireless communication system of a hierarchical cell structure according to an embodiment of the present invention. Here, FIGS. 5 to 8 illustrate an X2 interworking method for a case where a source eNB is a macro eNB, and a target eNB is a pico eNB, FIGS. 9 to 12 illustrate an X2 interworking method for a case where a source eNB is a pico eNB, and a target eNB is a macro eNB, and FIGS. 13 to 17 illustrate an X2 interworking method for a case where both a source eNB and a target eNB are pico eNBs.

Figure 5:
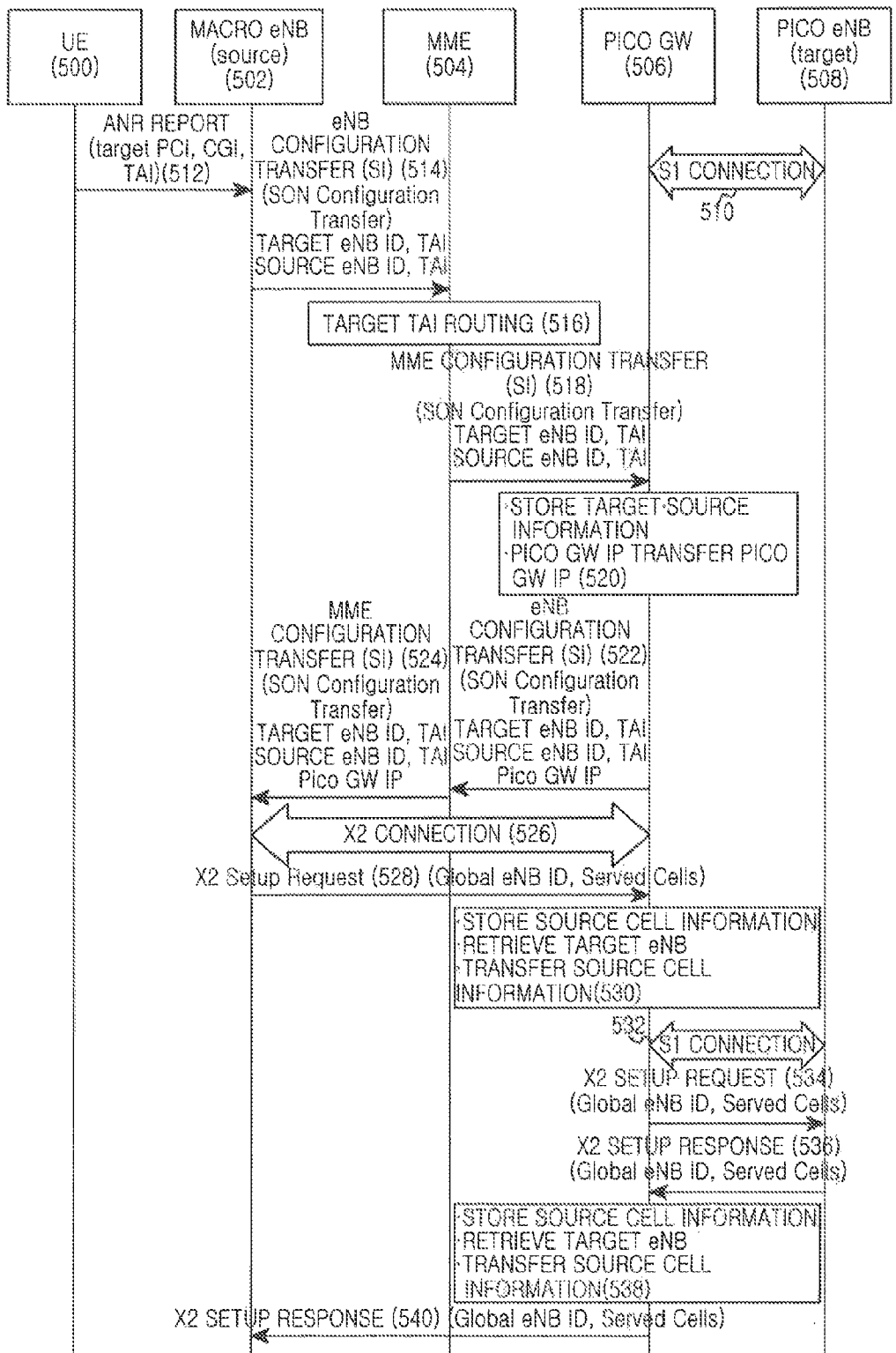
FIGS. 5 and 8 are views illustrating an X2 interworking method for a case where a source eNB is a macro eNB and a target eNB is a pico eNB in a wireless communication system having a hierarchical cell structure according to an embodiment of the present invention.

FIG. 5 illustrates a case where both a macro eNB and a pico eNB are not connected with a pico GW via the X2 interface in the case where the macro eNB requests X2 interface connection for the pico eNB.

Referring to FIG. 5, the pico GW 506 and the pico eNB 508 perform the S1 interface connection in step 510.

After that, when receiving information (ex: PCI, CGI, and TAI) regarding a target eNB from UE 500 in service in step 512, the macro eNB 502 proceeds to step 514 to transmit an eNB configuration transfer message requesting the IP information of the target eNB to an MME 504. Here, the eNB configuration transfer message includes the identify information of the macro eNB 502, that is, the identify information of a source eNB, relevant Tracking Area Identity (TAI), the identify information of the target eNB, and relevant TAI. Then, the MME 504 determines a path via which it will transmit an MME configuration transfer message based on target TAI information of an eNB configuration transfer message received from the macro eNB 502 in step 516, and transmits the MME configuration transfer message to the pico GW 506 corresponding to the target TAI in step 518. Here, the MME configuration transfer message includes the same information as the eNB configuration transfer message.

The pico GW 506 that has received the MME configuration transfer message analyzes the information of the target eNB included in the message to determine the target eNB is the pico eNB 508, determines IP information obtained in advance via the S1 interface for the relevant pico eNB 508, and maps the information of the source eNB to the information of the target eNB and stores the same in step 520. At this point, the pico GW 506 determines to transfer the IP information of the pico GW 506 to the source eNB instead of the IP information of the pico eNB 508.

After that, the pico GW 506 transmits an eNB configuration transfer message including the IP information of the pico GW 506 via the S1 interface in step 522. Then, the MME 504 transmits an MME configuration transfer message including the same information as the eNB configuration transfer message to the macro eNB 502 in step 524.

After that, the macro eNB 502 and the pico GW 506 performs X2 connection via an SCTP in step 526, and the macro eNB 502 transmits an X2 setup request message including the cell information of the macro eNB 502 to the pico GW 506 in step 528. Here, the X2 setup request message includes a global eNB ID and served cells information of the macro eNB. Here, the served cells include the cell in formation of the macro eNB and the neighbor cell information.

The pico GW 506 that has received the X2 setup request message from the macro eNB 502 determines to store the cell information of the macro eNB, retrieve a target eNB mapped to the macro eNB, and transfer the cell information of the macro eNB to the pico eNB 508 which is the target eNB in step 530. Here, since the pico GW 506 has not been connected with the pico eNB 508 via the X2 interface, the pico GW 506 performs X2 connection with the pico eNB 508 via the SCTP in step 532, and then proceeds to step 534 to transmit an X2 setup request message including the cell information of the macro eNB to the pico eNB 508.

The pico eNB 508 that has received the X2 setup request message transmits an X2 setup response message including the cell information of the pico eNB 508 to the pico GW 506 in step 536. Here, the cell information of the pico eNB 508 includes a global eNB ID and served cells information. Here, the served cells include the cell information of the macro eNB and the neighbor cell information.

After that, the pico GW 506 determines to store the cell information of the pico eNB 508, retrieve a source eNB mapped to the pico eNB 508, and transfer the cell information of the pico eNB 508 to the retrieved source eNB, that is, the macro eNB 502 in step 538, and then proceeds to step 540 to transmit an X2 setup response message including the cell information of the pico eNB 508 to the macro eNB 502.

After that, the macro eNB 502 which is the source eNB and the pico eNB 508 which is the target eNB can perform an X2 handover procedure for the UE 500.

Figure 6:
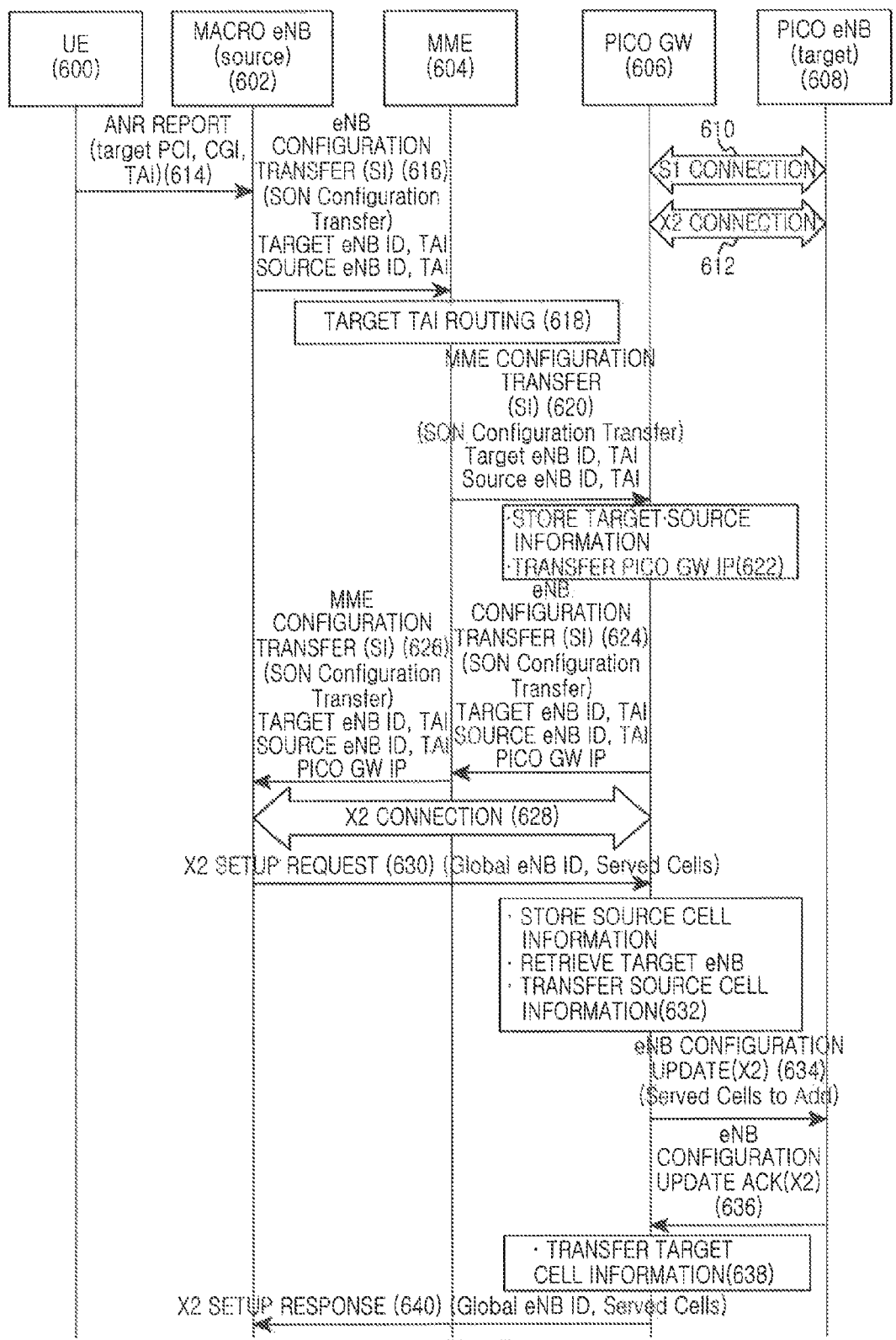

FIG. 6 illustrates a case where an X2 interface has been connected in advance between a pico eNB and a pico GW in the case where a macro eNB requests X2 interface connection for the pico eNB.

Referring to FIG. 6, the pico GW 606 and the pico eNB 608 perform S1 interface connection in step 610, and perform X2 connection based on an SCTP in step 612.

Since steps 614 to 632 are performed in the same way as steps 512 to 530 of FIG. 5, description thereof is omitted.

After that, the pico GW 606 that has determined to transfer the cell information of the macro eNB 602 to the pico eNB 608 in step 632 proceeds to step 634 to transfer the cell information of the macro eNB 602 to the pico eNB 608 via an eNB configuration update message. That is, since the pico GW 606 has already been connected with the pico eNB 608 via the X2 interface, the pico GW 606 can transmit the cell information of the macro eNB 602 using the eNB configuration update message for updating the cell information. At this point, the pico GW 606 can transmit only cell information required by the pico eNB 608. That is, the pico GW 606 generates an eNB configuration update message including only served cells information representing neighbor cell information and transmits the same via the X2 interface.

The pico eNB 608 that has received the eNB configuration update message transmits an eNB configuration update ack message representing it has received the cell information of the macro eNB 602 to the pico GW 606 via the X2 interface in step 636.

Then, the pico GW 606 retrieves the cell information of the pico eNB 608 obtained and stored upon connection with the pico eNB 608 via the X2 interface in step 638, and proceeds to step 640 to transmit an X2 setup response message including the cell information of the pico eNB 608 to the macro eNB 602.

After that, the macro eNB 602 which is the source eNB and the pico eNB 608 which is the target eNB can perform an X2 handover procedure for the UE 600.

Figure 7:
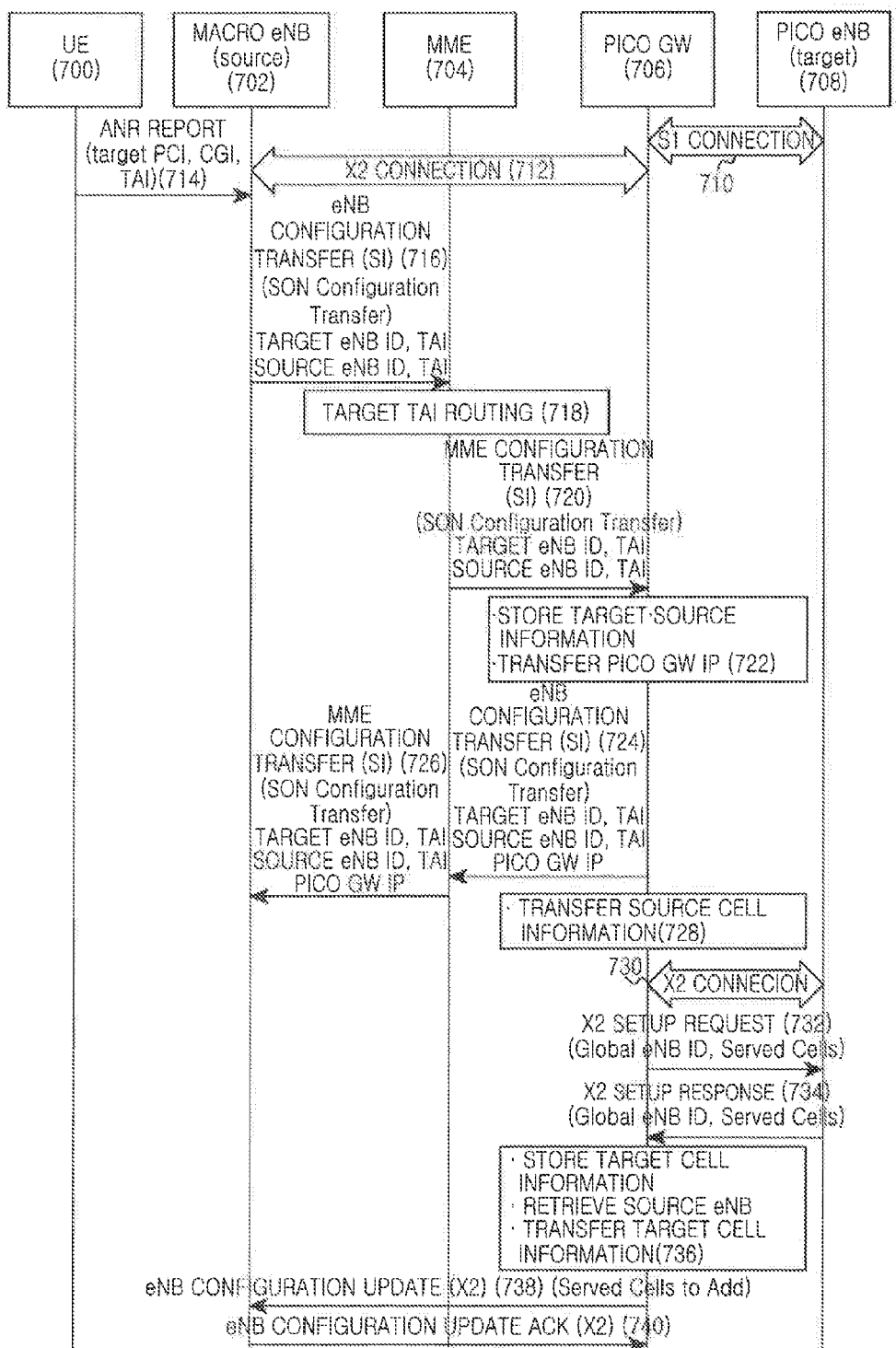

FIG. 7 illustrates a case where a macro eNB and a pico GW are connected via the X2 interface in advance in the case where the macro eNB requests X2 interface connection for a pico eNB.

Referring to FIG. 7, the pico GW 706 and the pico eNB 708 perform S1 interface connection in step 710, and the macro eNB 702 and the pico GW 706 perform X2 connection based on an SCTP in step 712.

Since steps 714 to 726 are performed in the same way as steps 512 to 524 of FIG. 5, description thereof is omitted.

After step 726, since the pico GW 706 is connected with the macro eNB 702 via the X2 interface previously, the pico GW 706 can determine to connect with the pico eNB 708 which is a target eNB via the X2 interface. At this point, the pico GW 706 determines to transfer the cell information of the macro eNB 702 to the pico eNB 708 in step 728. Here, the cell information of the macro eNB 702 is information obtained when the pico GW 706 is connected with the macro eNB 702 via the X2 interface, and includes the global eNB ID and served cells information of the macro eNB 702.

The pico GW 706 proceeds to step 730 to perform X2 connection with the pico eNB 708 via the SCTP, and then proceeds to step 732 to transfer an X2 setup request message including the cell information of the macro eNB to the pico eNB 708.

The pico eNB 708 that has received the X2 setup request message transmits an X2 setup response message including the cell information of the pico eNB 708 to the pico GW 706 in step 734. Here, the cell information of the pico eNB 708 includes a global eNB ID and served cells information.

After that, the pico GW 706 determines to store the cell information of the pico eNB 708, retrieve a source eNB mapped to the pico eNB, and transfer the cell information of the pico eNB 708 to the macro eNB 702 in step 736, and then proceeds to step 738 to transmit an eNB configuration update message including the cell information of the pico eNB 708 to the macro eNB 702. At this point, the pico GW 706 can generate an eNB configuration update message including only cell information required by the macro eNB 702, that is, only served cells information representing a neighbor cell and transmit the same via the X2 interface.

After that, the macro eNB 702 that has received the eNB configuration update message transmits an eNB configuration update ack message representing it has received the cell information of the pico eNB 708 to the pico GW 706 via the X2 interface in step 740.

After that, the macro eNB 702 which is a source eNB and the pico eNB 708 which is a target eNB can perform an X2 handover procedure for the UE 700.

Figure 8:
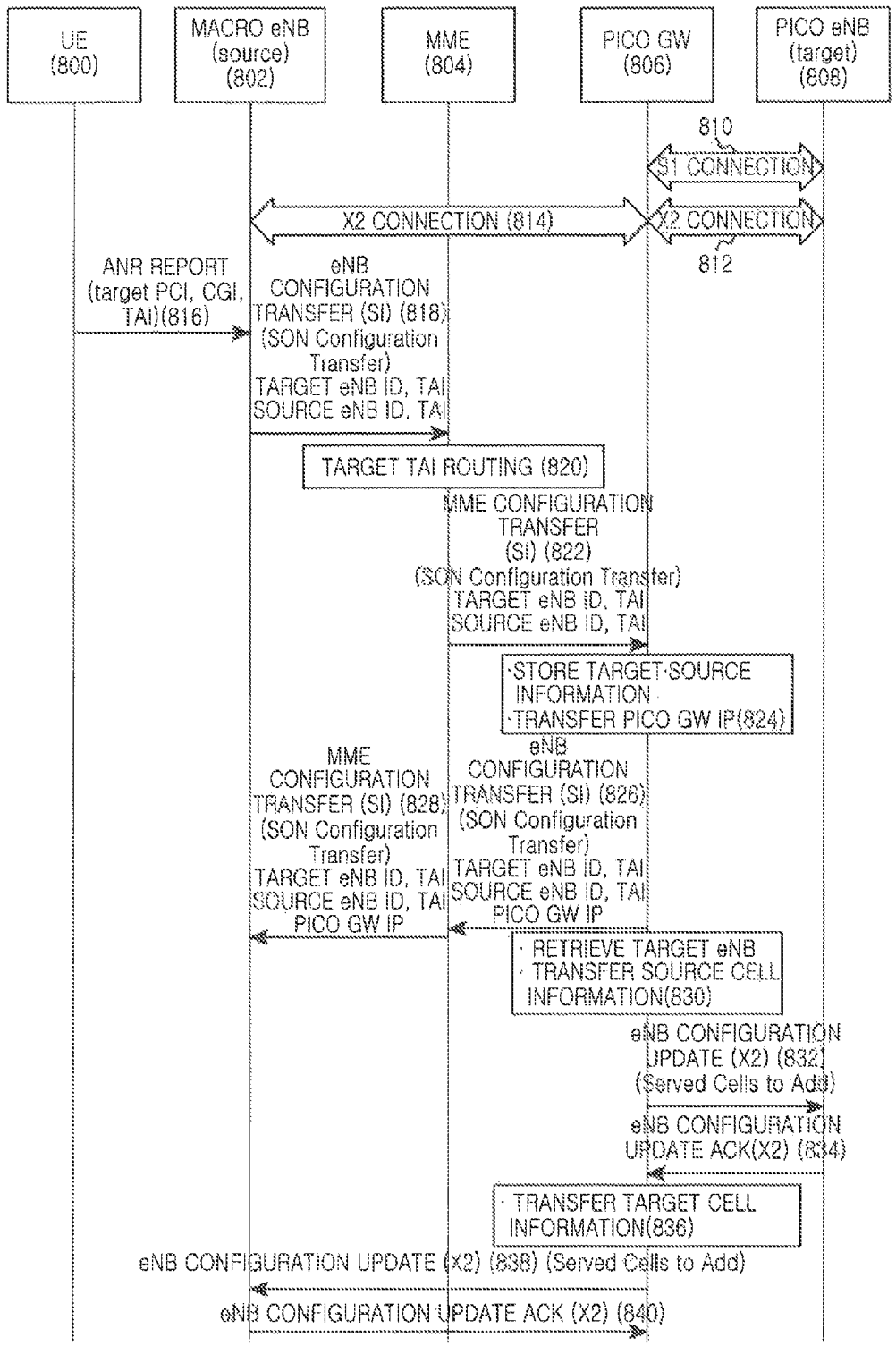

FIG. 8 illustrates a case where the X2 interface is connected between a macro eNB and a pico GW in advance and the X2 interface is connected between the pico GW and a pico eNB in advance in the case where the macro eNB requests X2 interface connection for the pico eNB.

Referring to FIG. 8, the pico GW 806 and the pico eNB 808 perform S1 interface connection in step 810, perform X2 connection in step 812 first, and the macro eNB 802 and the pico GW 806 perform X2 connection in step 814.

After that, since steps 816 to 828 are performed in the same way as steps 512 to 524 of FIG. 5, description thereof is omitted.

After step 828, since the pico GW 806 is connected with the macro eNB 802 and the pico eNB 808 via the X2 interface previously, the pico GW 806 determines to transfer the cell information of the macro eNB to the pico eNB 808 in step 830, and proceeds to step 832 to transmit the cell information of the macro eNB 802 to the pico eNB 808 via an eNB configuration update message. That is, since the pico GW 806 is connected with the pico eNB 808 via the X2 interface in advance, the pico GW 806 can transmit the cell information of the macro eNB 802 using an eNB configuration update message for updating cell information. At this point, the pico GW 806 generates an eNB configuration update message including only cell information required by the pico eNB 808, that is, only served cells information representing neighbor cell information and transmits the same via the X2 interface.

The pico eNB 808 that has received the eNB configuration update message transmits an eNB configuration update ack message representing it has received the cell information of the macro eNB 802 to the pico GW 806 via the X2 interface in step 834.

After that, the pico GW 806 determines to retrieve the cell information of the pico eNB 808, and transfer the cell information of the pico eNB 808 to a source eNB mapped to the pico eNB, that is, the macro eNB 802 in step 836, and transmits an eNB configuration update message including the cell information of the pico eNB 808 to the macro eNB 802 in step 838. At this point, the pico GW 806 can generate an eNB configuration update message including only cell information required by the macro eNB 808, that is, only served cells information representing a neighbor cell, and transmit the same via the X2 interface.

After that, the macro eNB 802 that has received the eNB configuration update message transmits an eNB configuration update ack message representing it has received the cell information of the pico eNB 808 to the pico GW 806 via the X2 interface in step 840.

After that, the macro eNB 802 which is the source eNB and the pico eNB 808 which is the target eNB can perform an X2 handover procedure for the UE 800.

Figure 9:
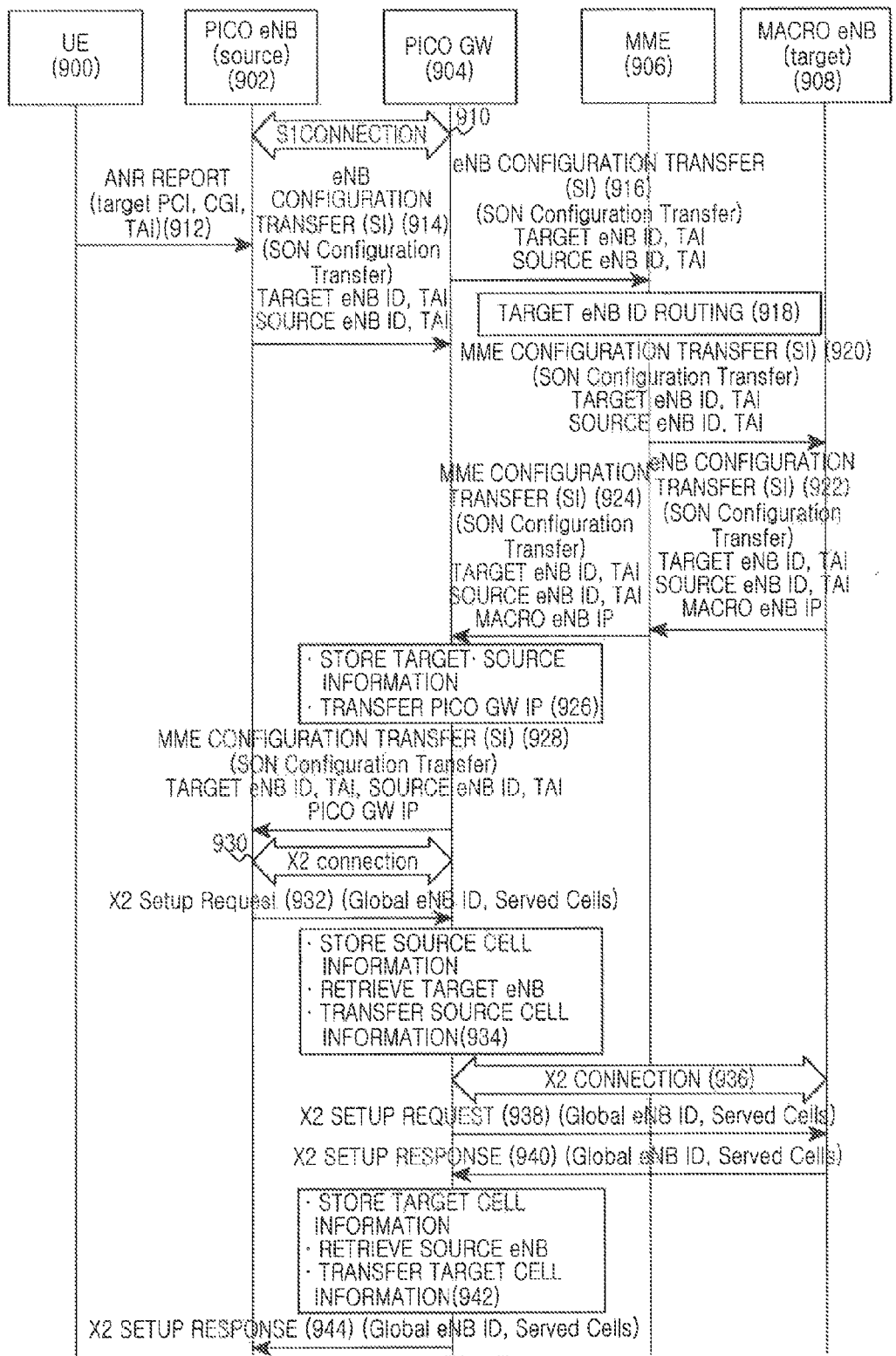
FIGS. 9 to 12 are views illustrating an X2 interworking method for a case where a source eNB is a pico eNB and a target eNB is a macro eNB in a wireless communication system having a hierarchical cell structure according to an embodiment of the present invention.

FIG. 9 illustrates a case where both a macro eNB and a pico eNB are not connected with a pico GW via the X2 interface in the case where the pico eNB requests X2 interface connection for the macro eNB.

Referring to FIG. 9, the pico eNB 902 and the pico GW 904 perform S1 interface connection first in step 910.

After that, when receiving information (ex: PCI, CGI, and TAI) for a target eNB from UE 900 in service in step 912, the pico eNB 902 proceeds to step 914 to transmit an eNB configuration transfer message requesting the IP information of a target eNB to the pico GW 904 via the S1 interface. Here, the eNB configuration transfer message includes the identify information of the pico eNB 902, that is, the identify information of a source eNB and relevant TAI, and the identify information of a target eNB and relevant TAI.

Then, the pico GW 904 analyzes the information of the target eNB included in the message to determine the target eNB is a macro eNB 908, and since the pico GW 904 has not been connected with the relevant macro eNB 908 via the X2 interface, the pico GW 904 transmits the eNB configuration transfer message to a relevant MME 906 in order to obtain the IP information of the macro eNB 908 in step 916. Then, the MME 906 determines a path via which an MME configuration transfer message will be transmitted based on the target TAI information of the eNB configuration transfer message received from the pico GW 904 in step 918, and transmits the MME configuration transfer message to the macro eNB 906 in step 920. Here, the MME configuration transfer message includes the same information as the eNB configuration transfer message.

The macro eNB 908 that has received the MME configuration transfer message transmits an eNB configuration transfer message including the IP information of the macro eNB 908 to the MME 906 in step 922. The MME 906 transmits an MME configuration transfer message including the IP information of the macro eNB to the pico GW 904 in step 924.

The pico GW 904 that has received the MME configuration transfer message determines to store the IP information of the macro eNB, map the pico eNB 902 to the macro eNB 908 and store the same, and then transfer the IP of the pico GW 904 to the pico eNB 902 instead of the IP of the macro eNB 908 in step 926.

After that, the pico GW 904 transmits an MME configuration transfer message including the IP information of the pico GW 904 to the pico eNB 902 via the S1 interface in step 928.

After that, the pico eNB 902 and the pico GW 904 performs X2 connection via an SCTP in step 930. The pico eNB 902 transmits an X2 setup request message including the cell information of the pico eNB 902 to the pico GW 904 in step 932. Here, the X2 setup request message includes a global eNB ID and served cells information of the pico eNB. Here, the served cells information includes the cell information of the macro eNB and neighbor cell info-nation.

The pico GW 904 that has received the X2 setup request message from the pico eNB 902 determines to store the cell information of the pico eNB, retrieve a target eNB mapped to the pico eNB, and transfer the cell information of the pico eNB to the macro eNB 908 which is the target eNB in step 934. Here, since the pico GW 904 has not been connected with the macro eNB 908 via the X2 interface, the pico GW 904 performs X2 connection with the macro eNB 908 via the SCTP in step 936, and then proceeds to step 938 to transmit an X2 setup request message including the cell information of the pico eNB to the macro eNB 908.

The macro eNB 908 that has received the X2 setup request message transmits an X2 setup response message including the cell information of the macro eNB to the pico GW 904 in step 940. Here, the cell information of the macro eNB 908 includes a global eNB ID and served cells information. Here, the served cells information includes the cell information of the macro eNB and neighbor cell information.

After that, the pico GW 904 determines to store the cell information of the macro eNB 908 and transfer the cell information of the macro eNB 908 to a source eNB mapped to the macro eNB 908, that is, the pico eNB 902 in step 942, and then proceeds to step 944 to transmit an X2 setup response message including the cell information of the macro eNB 908 to the pico eNB 902.

After that, the pico eNB 902 which is the source eNB and the macro eNB 908 which is the target eNB can perform an X2 handover procedure for the UE 900.

Figure 10:
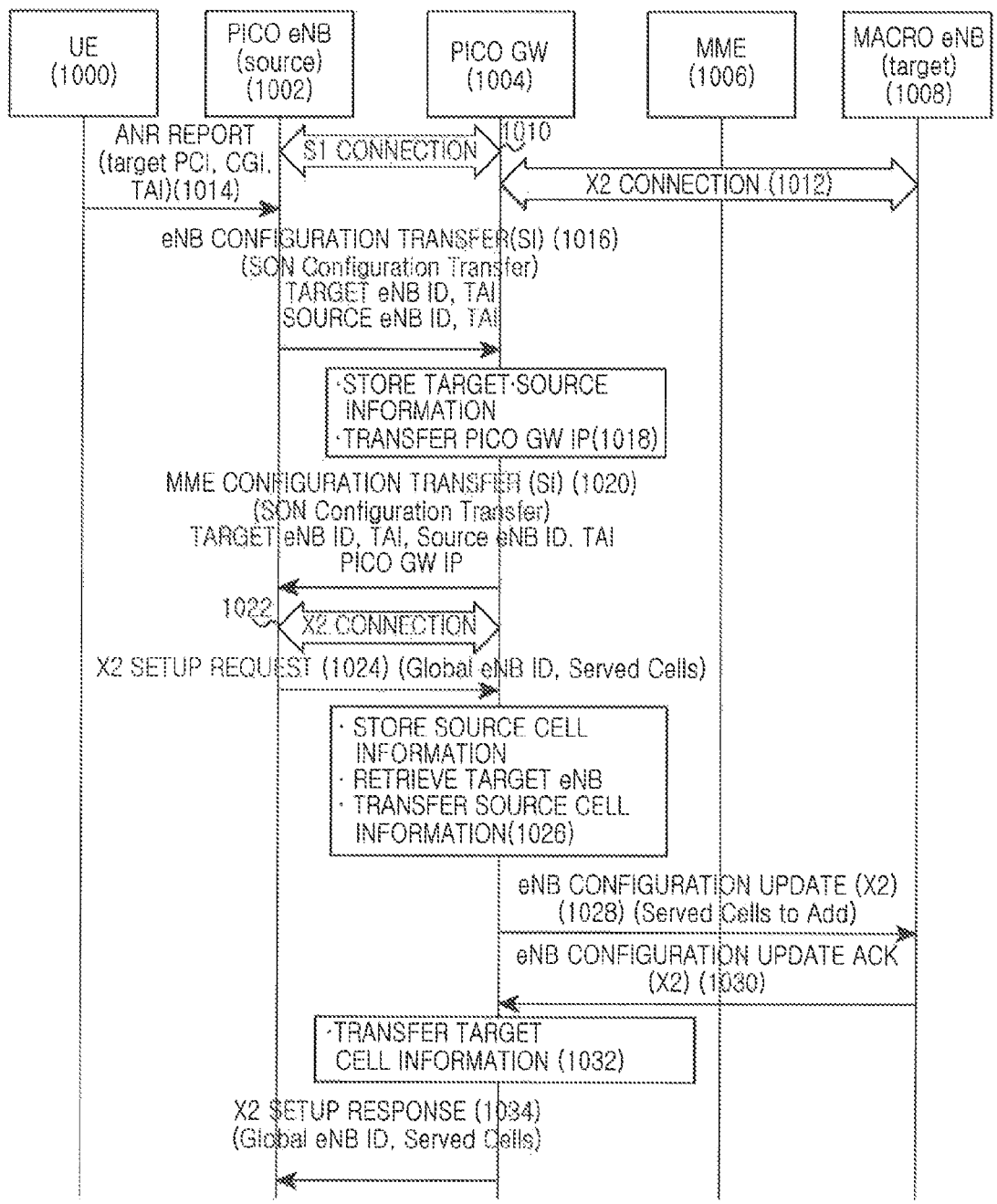

FIG. 10 illustrates a case where a macro eNB and a pico GW are connected via the X2 interface in advance in the case where a pico eNB requests the X2 interface connection for the macro eNB.

Referring to FIG. 10, the pico eNB 1002 and the pico GW 1004 perform S1 interface connection in step 1010. The pico GW 1004 and the macro eNB 1008 are connected via the X2 interface in step 1012.

After that, when receiving the information (ex: PCI, CGI, and TAI) for a target eNB from UE 1000 in service in step 1014, the pico eNB 1002 proceeds to step 1016 to transmit an eNB configuration transfer message requesting the IP information of the target eNB to the pico GW 1004 via the S1 interface. Here, the eNB configuration transfer message includes identify information of the pico eNB 1002, that is, the identify information of a source eNB and relevant TAI, and the identify information of the target eNB and relevant TAI.

Then, the pico GW 1004 analyzes the information of the target eNB included in the message to determine the target eNB is the macro eNB 1008, and since the pico GW 1004 is already connected with the relevant macro eNB 1008 via the X2 interface, the pico GW 1004 determines the IP information of the macro eNB stored in advance and then maps the pico eNB 1002 to the macro eNB 1008 to store the same in step 1018. At this point, the pico GW 1004 determines to transfer the IP of the pico GW 1004 to the pico eNB 1002 instead of the IP of the macro eNB 1008.

After that, the pico (GW 1004 transmits an MME configuration transfer message including the IP information of the pico GW 1004 to the pico eNB 1002 via the S1 interface in step 1020.

After that, the pico eNB 1002 and the pico GW 1004 perform X2 connection via the SCTP in step 1022, and the pico eNB 1.002 transmits an X2 setup request message including the cell information of the pico eNB 1002 to the pico GW 1004 in step 1024. Here, the X2 setup request message includes a global eNB ID and served cells information of the pico eNB. The served cells information includes the cell information of the macro eNB and neighbor cell information.

The pico GW 1004 that has received the X2 setup request message from the pico eNB 1002 determines to store the cell information of the pico eNB, retrieves a target eNB mapped to the pico eNB, and transfer the cell information of the pico eNB to the macro eNB 1008 which is the target eNB in step 1026. Here, since the pico GW 1004 is already connected with the macro eNB 1008 via the X2 interface, the pico GW 1004 transmits an eNB configuration update message including the cell information of the pico eNB 1002 to the macro eNB 1008 in step 1028. At this point, the eNB configuration update message includes served cells information representing information regarding neighbor cell and is transmitted/received via the X2 interface.

The macro eNB 1008 that has received the eNB configuration update message transmits an eNB configuration update ack message representing it has received the cell information of the pico eNB 1002 to the pico GW 1004 via the X2 interface in step 1030.

Then, the pico GW 1004 retrieves the cell information of the macro eNB 1008 obtained and stored upon connection with the macro eNB 1008 in step 1032, and proceeds to step 1034 to transmit an X2 setup response message including the cell information of the macro eNB 1008 to the pico eNB 1002.

After that, the pico eNB 1002 which is the source eNB and the macro eNB 1008 which is the target eNB can perform an X2 handover procedure for the UE 1000.

Figure 11:
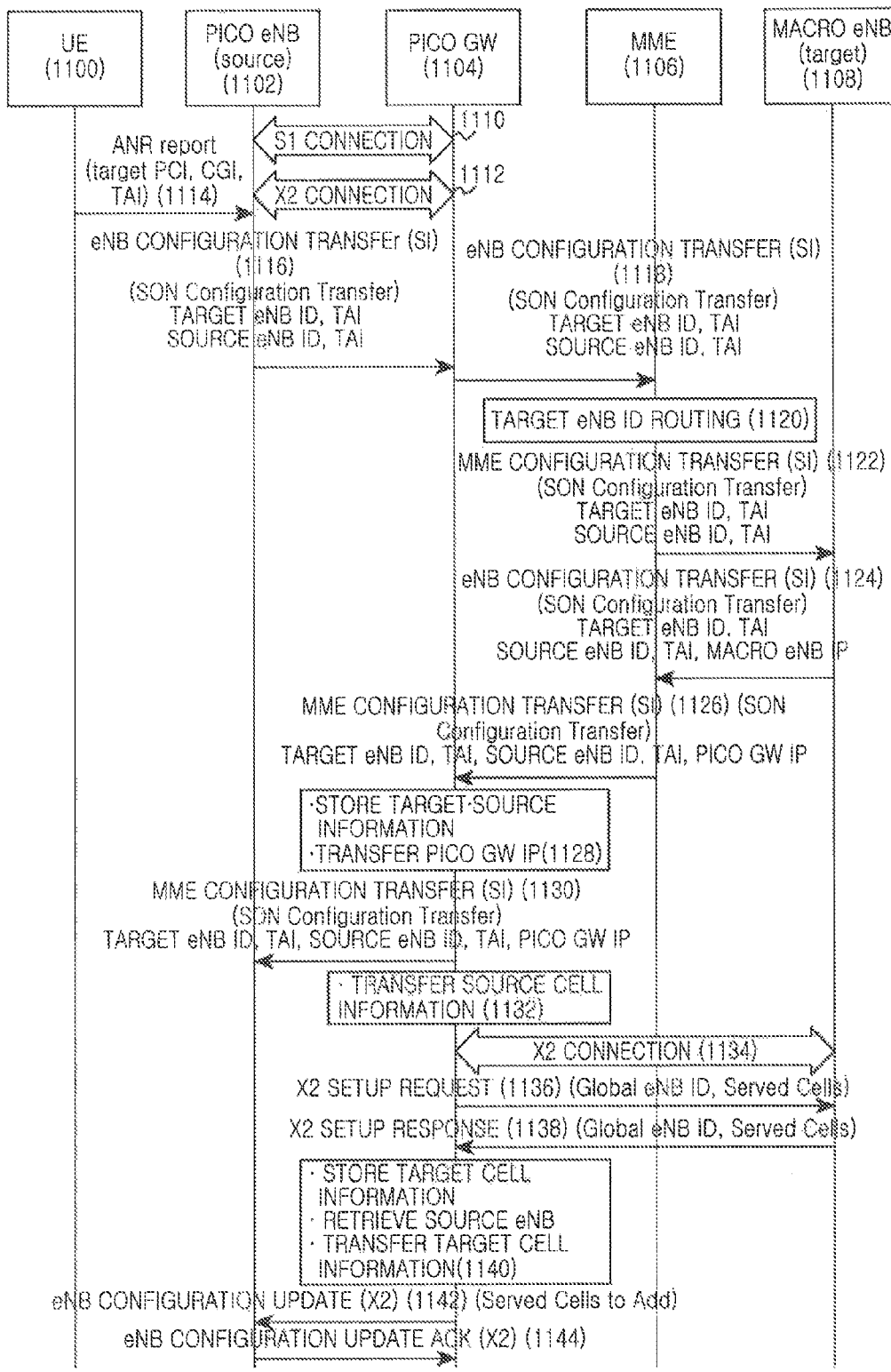

FIG. 11 illustrates a case where a pico eNB and a pico GW are already connected via the X2 interface in the case where the pico eNB requests X2 interface connection for a macro eNB.

Referring to FIG. 11, the pico eNB 1102 and the pico GW 1104 perform S1 interface connection first in step 1110, and perform X2 interface connection in step 112.

Here, since steps 1114 to 1130 of FIG. 11 are performed in the same way as steps 912 to 928 of FIG. 9, description thereof is omitted.

Since the pico GW 1104 is already connected with the pico eNB 1102 via the X2 interface, the pico GW 1104 that has transmitted the IP information of the pico GW 1104 to the pico eNB 1102 can determine to connect with the macro eNB 1108 via the X2 interface in step 1130. At this point, the pico GW 1104 determines to transfer the cell information of the pico eNB 1102 to the macro eNB 1108 in step 1132, performs X2 connection with the macro eNB 1108 based on an SCTP in step 1134, and transmits an X2 setup request message including the cell information of the pico eNB 1102 to the macro eNB 1108 in step 1136.

The macro eNB 1108 that has received the X2 setup request message transmits an X2 setup response message including the cell information of the macro eNB 1108 to the pico GW 1104 in step 1138. Here, the cell information of the macro eNB 1108 includes a global eNB ID and served cells information. Here, the served cells information includes the cell information of the macro eNB and the neighbor cell information.

After that, the pico GW 1104 determines to store the cell information of the macro eNB 1108 and transfer the cell information of the macro eNB 1108 to a source eNB mapped to the macro eNB 1108, that is, the pico eNB 1102 in step 1140, and then proceeds to step 1142 to transmit an eNB configuration update message including the cell information of the macro eNB 1108 to the pico eNB 1102.

The pico eNB 1102 that has received the eNB configuration update message transmits an eNB configuration update ack message representing it has received the cell information of the macro eNB 1108 to the pico GW 1104 via the X2 interface in step 1144.

After that, the pico eNB 1102 which is the source eNB and the macro eNB 1108 which is the target eNB can perform an X2 handover procedure for the UE 1100.

Figure 12:
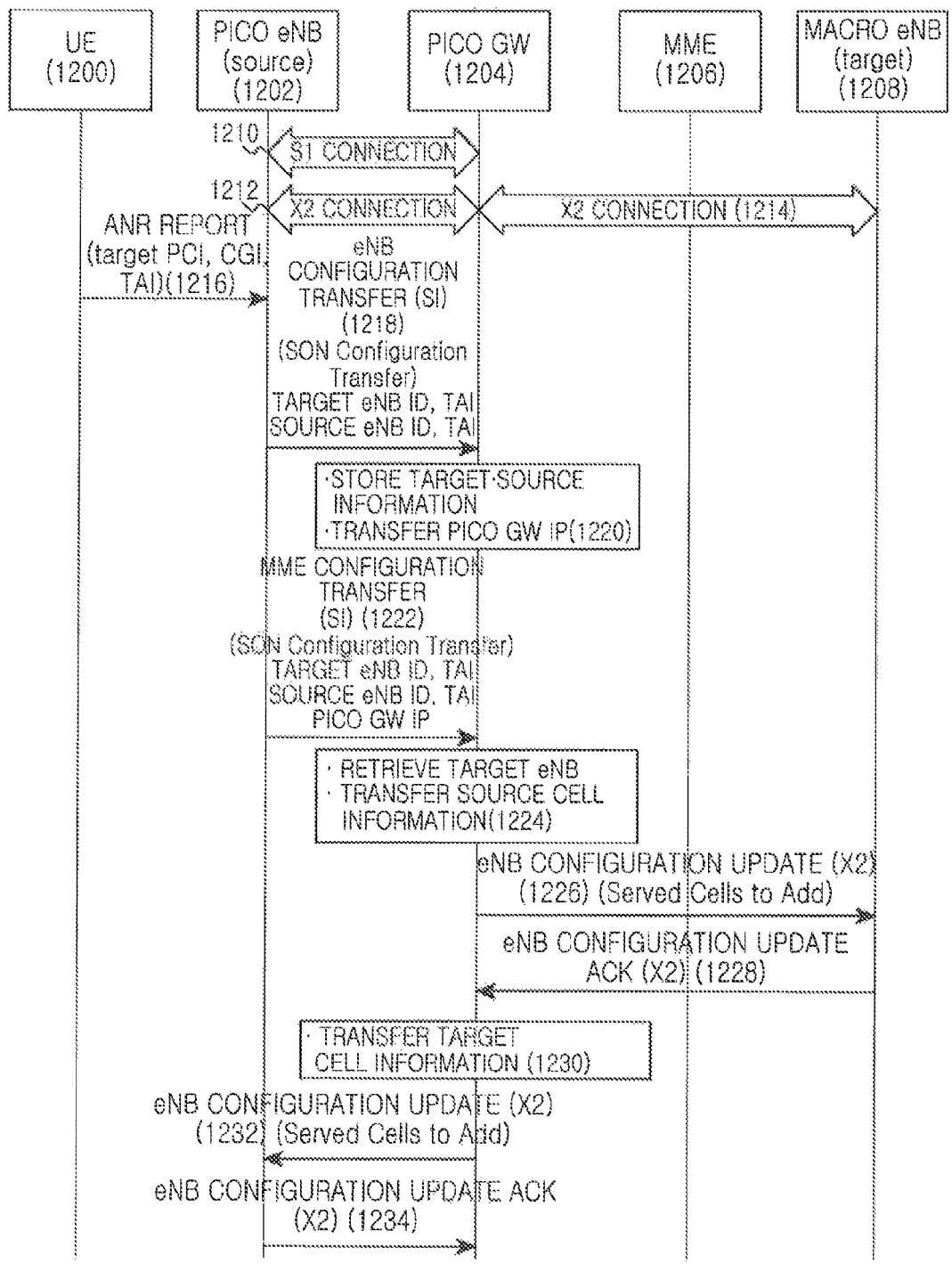

FIG. 12 illustrates a case where a macro eNB and a pico GW are connected via the X2 interface in advance and the pico GW and a pico eNB are connected via the X2 interface in advance in the case where the pico eNB requests X2 interface connection for the macro eNB.

Referring to FIG. 12, the pico eNB 1202 and the pico GW 1204 perform S1 interface connection first in step 210, and are connected via the X2 interface in advance in step 1212, and the pico GW 1204 and the macro eNB 1208 are connected via the X2 interface in advance in step 1214.

Here, since steps 121 to 122 of FIG. 12 are performed in the same way as steps 1014 to 1020 of FIG. 10, description thereof is omitted.

The pico GW 1204 that has transmitted the IP information of the pico GW 1204 to the pico eNB 1202 in step 4224, since the pico eNB 1202 and the macro eNB 1208 are already connected via the X2 interface, the pico GW 1204 determines to transfer the cell information of the pico eNB to the macro eNB in step 1224, and proceeds to step 1226 to transmit an eNB configuration update message including the cell information representing a neighbor cell of the pico eNB 1202 to the macro eNB 1208.

The pico GW 1204 that has received an X2 setup request message from the pico eNB 1202 determines to store the cell information of the pico eNB, retrieves a target eNB mapped to the pico eNB, and transfer the cell information of the pico eNB to the macro eNB 1208 which is the target eNB in step 1226. Here, since the pico GW 1204 and the macro eNB 1208 are connected via the X2 interface in advance, the pico GW 1204 transmits an eNB configuration update message including the cell information of the pico eNB 1202 to the macro eNB 1208 in step 1226. At this point, the eNB configuration update message includes served cells information and is transmitted/received via the X2 interface.

The macro eNB 1208 that has received the eNB configuration update message transmits an eNB configuration update ack message representing it has received the cell information of the pico eNB 1202 to the pico (GW 1204 via the X2 interface in step 1228.

Then, the pico GW 1204 retrieves the cell information of the macro eNB 1208 obtained and stored upon connection with the macro eNB 1208 via the X2 interface in step 1230 and proceeds to step 1232 to transmit an eNB configuration update message including the cell information representing a neighbor cell of the macro eNB 1208 to the pico eNB 1202.

The pico eNB 1202 that has received the eNB configuration update message transmits an eNB configuration update ack message representing it has received the cell information of the macro eNB 1208 to the pico GW 1204 via the X2 interface in step 1234.

After that, the pico eNB 1202 which is the source eNB and the macro eNB 1208 which is the target eNB can perform an X2 handover procedure for the UE 1200.

Figure 13:
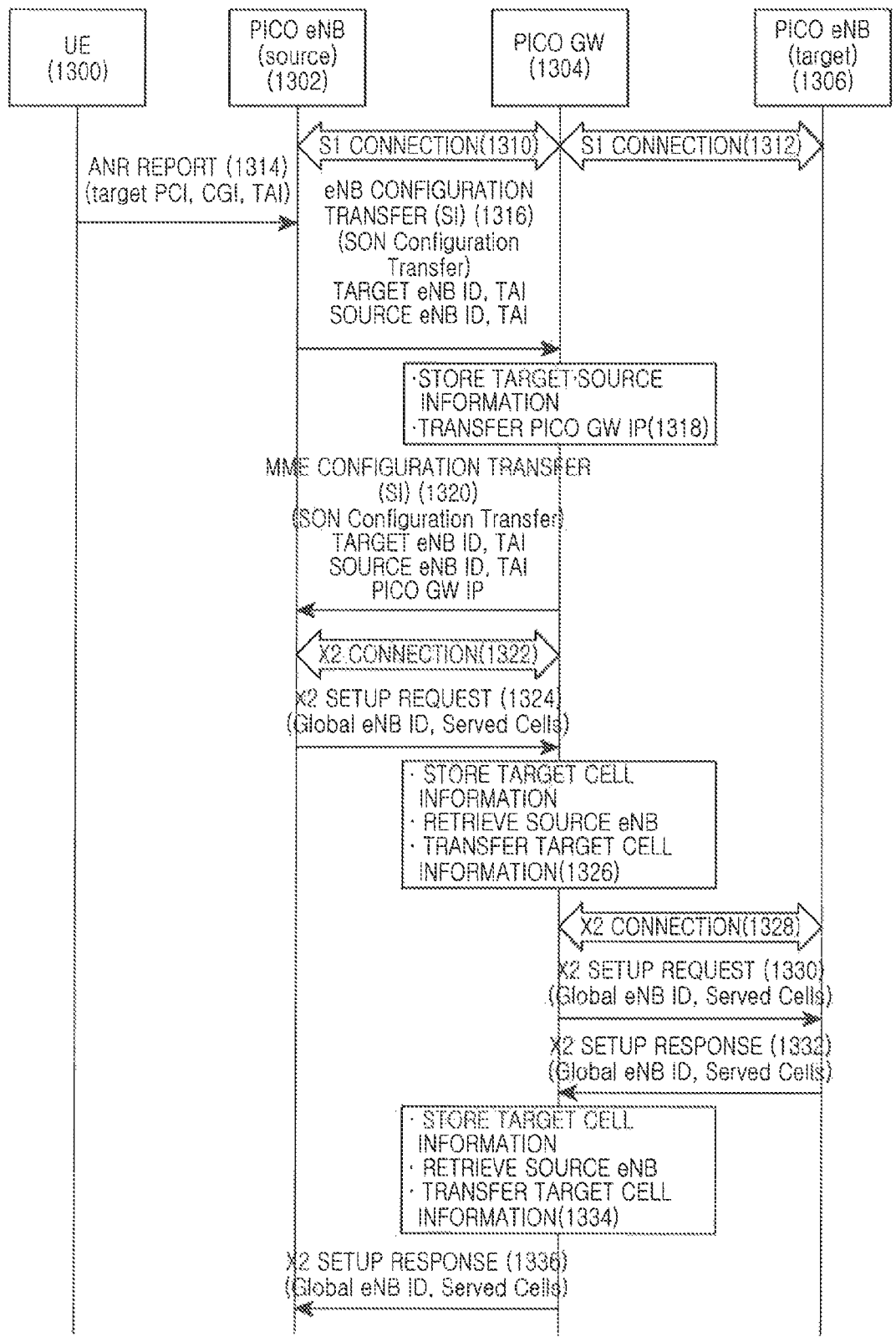
FIGS. 13 to 16 are views illustrating an X2 interworking method for a case where both a source eNB and a target eNB are pico eNBs in a wireless communication system having a hierarchical cell structure according to an embodiment of the present invention.

FIG. 13 illustrates a case where two pico eNBs are not connected with a pico GW via the X2 interface in the case where the pico eNB requests the X2 interface connection for the pico eNB.

Referring to FIG. 13, the pico GW 1304 performs S1 interface connection with the two pico eNBs 1302 and 1306 first in steps 1310 and 1312.

After that, when receiving information (ex: PCI, CGI, and TAI) regarding a target eNB from UE 1300 in service in step 1314, the pico eNB 1302 (referred to as a 'source pico eNB' hereinafter) proceeds to step 1316 to transmit an eNB configuration transfer message requesting the IP information of the target eNB to the pico GW 1304 via the S1 interface. Here, the eNB configuration transfer message includes the identify information of the source pico eNB 1302 and relevant TAI, and the identify information of the target eNB and relevant TAI. Then, the pico GW 1304 that has received the eNB configuration transfer message analyzes the information of the target eNB included in the message to determine the target eNB is the pico eNB 1306 (referred to as a 'target pico eNB' hereinafter), determines IP information obtained in advance via the S1 interface for the target pico eNB 1306, and maps the information of the source pico eNB to the information of the target pico eNB and stores the same in step 1318. At this point, the pico GW 1304 determines to transfer the IP information of the pico GW 1304 to the source pico eNB 1302 instead of the IP information of the target pico eNB 1306.

After that, the pico GW 1304 transmits an MME configuration transfer message including the IP information of the pico GW 1304 via the S1 interface in step 1320.

After that, the source pico eNB 1302 and the pico GW 1304 perform X2 connection via an SCTP in step 1322, and the source pico eNB 1302 transmits an X2 setup request message including the cell information of the source pico eNB 1302 to the pico GW 1304 in step 1324. Here, the X2 setup request message includes the global eNB ID and served cells information of the pico eNB. Here, the served cells information includes the cell information and neighbor cell in formation of the pico eNB.

The pico GW 1304 that has received the X2 setup request message from the source pico eNB 1302 determines to store the cell information of the source pico eNB, retrieve a target eNB mapped to the source pico eNB, and transfer the cell information of the source pico eNB to the target pico eNB 1306 which is the target eNB in step 1326. Here, since the pico GW 1304 has not been connected with the target pico eNB 1306 via the X2 interface, the pico GW 1304 performs X2 connection with the target pico eNB 1306 via the SCTP in step 1328, and then proceeds to step 1330 to transmit an X2 setup request message including the cell information of the source pico eNB to the target pico eNB 1306.

The target pico eNB 1306 that has received the X2 setup request message transmits an X2 setup response message including the cell information of the target pico eNB 1306 to the pico GW 1304 in step 1332. Here, the cell information of the target pico eNB 1306 includes a global eNB ID and served cells information. Here, the served cells information includes the cell information of the pico eNB and neighbor cell information.

After that, the pico GW 1304 determines to store the cell information of the target pico eNB 1306, retrieves a source eNB mapped to the target pico eNB 1306, and transfer the cell information of the target pico eNB 1306 to the retrieved source eNB, that is, the source pico eNB 1302 in step 1334, and then proceeds to step 1336 to transmit an X2 setup response message including the cell information of the target pico eNB 1306 to the source pico eNB 1302.

After that, the source pico eNB 1302 and the target pico eNB 1306 can perform an X2 handover procedure for the UE 1300.

Figure 14:
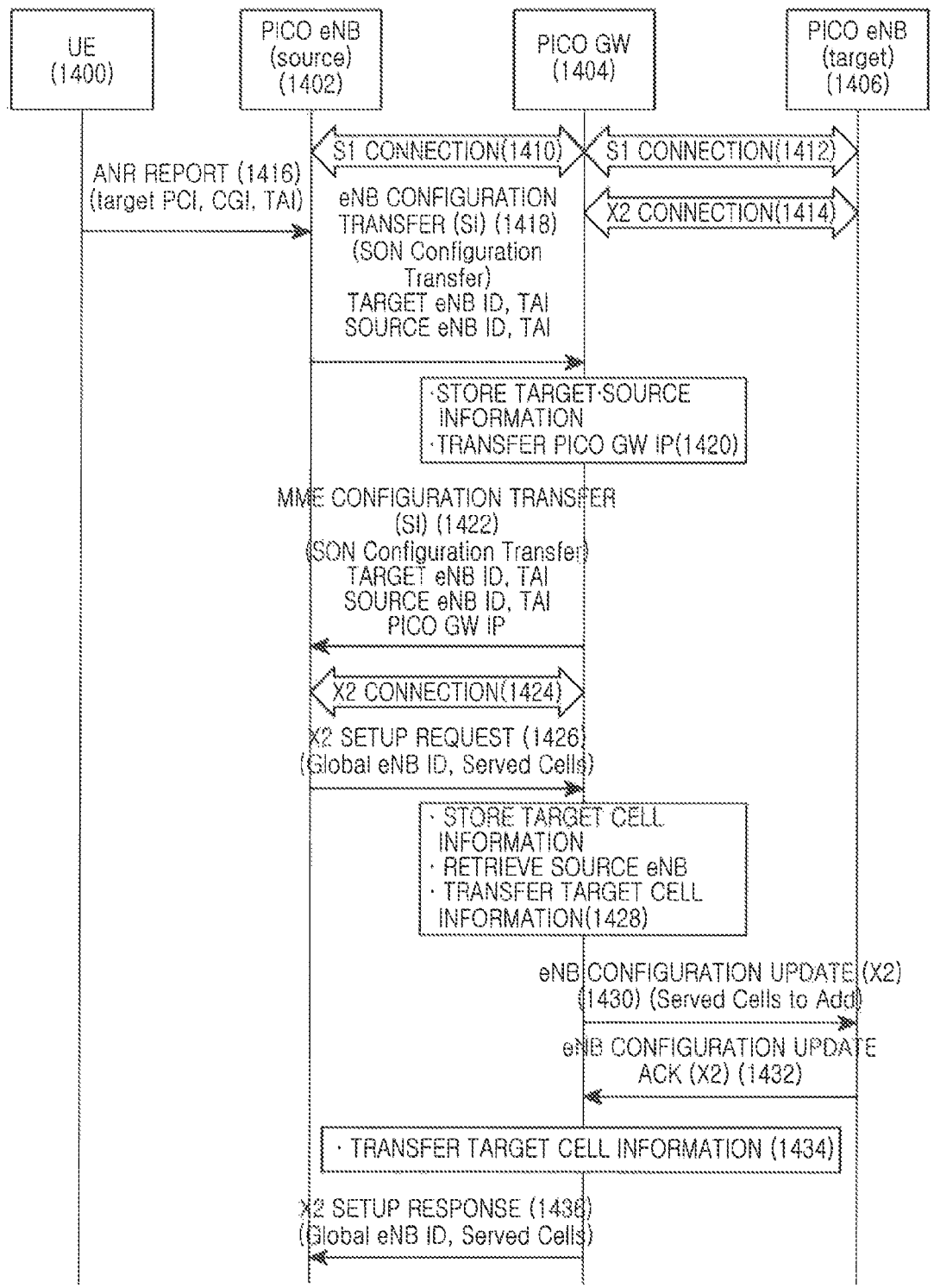

FIG. 14 illustrates a case where a target pico eNB and a pico GW are connected via the X2 interface in advance in the case where a pico eNB requests X2 interface connection for the pico eNB.

Referring to FIG. 14, the pico GW 1404 performs S1 interface connection with the two pico eNBs 1402 and 1406 in steps 1410 and 1412, and is connected with the pico eNB 1406 which is a target via the X2 interface in advance in step 1414.

Here, since steps 1416 to 1428 are the same as steps 1314 to 1326 of FIG. 13, description thereof is omitted.

The pico GW 1404 determines to transfer the cell information of the source pico eNB 1402 to the target pico eNB 1406 in step 1428, and since the pico GW 1404 is connected with the target pico eNB 1406 via the X2 interface in advance, the pico GW 1404 transmits an eNB configuration update message including cell information representing a neighbor cell of the source pico eNB to the target pico eNB 1406 in step 1430.

The target pico eNB 1406 that has received the eNB configuration update message transmits an eNB configuration update ack message representing it has received the cell information of the source eNB to the pico GW 1404 in step 1432.

After that, the pico GW 1404 determines to store the cell information of the target pico eNB 1406, and transfer the cell information of the target pico eNB 1406 to the source pico eNB 1402 mapped to the target pico eNB 1406 in step 1434, and then proceeds to step 1436 to transmit an X2 setup response message including the cell information of the target pico eNB 1406 to the source pico eNB 1402.

After that, the source pico eNB 1402 and the target pico eNB 1406 can perform an X2 handover procedure for the UE 1400.

Figure 15:
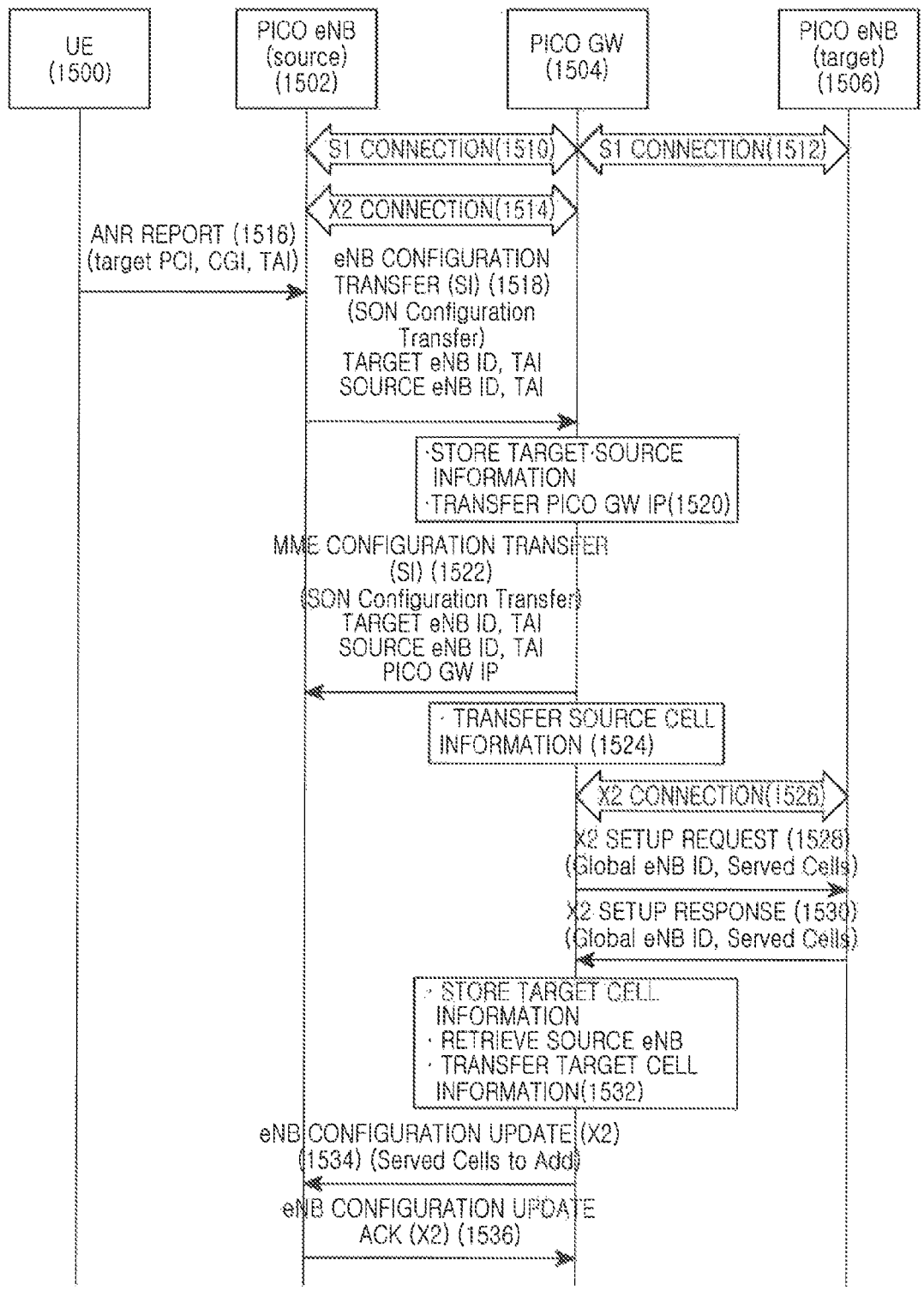

FIG. 15 illustrates a case where a source pico eNB and a pico GW are connected via the X2 interface in advance in the case where the pico eNB requests X2 interface connection for a pico eNB.

Referring to FIG. 15, the pico GW 1504 performs S1 interface connection with two pico eNBs 1502 and 1506 first in steps 1510 and 1512, and is connected with the source pico eNB 1502 via the X2 interface in advance in step 1514.

Here, since steps 1516 to 1522 are the same as steps 1314 to 1320 of FIG. 13, description thereof is omitted.

The pico GW 1504 transmits an MME configuration transfer message including the IP information of the pico GW 1504 to the source pico eNB 1502 in step 1522, and then determines to transfer the cell information of the source pico eNB 1502 to the target pico eNB 1506 in step 1524, and then is connected with the target pico eNB 1506 via the X2 interlace using an SCTP in step 1526. After that, the pico GW 1504 transmits an X2 setup request message including the cell information of the source pico eNB to the target pico eNB 1506 in step 1528.

The target pico eNB 1506 that has received the X2 setup request message transmits an X2 setup response message including the cell information of the target pico eNB 1506 to the pico GW 1504 in step 1530. Here, the cell information of the target pico eNB 1506 includes a global eNB and served cells information. Here, the served cells information includes the cell information of the pico eNB and neighbor cell information.

After that, the pico GW 1504 determines to store the cell information of the target pico eNB 1506, retrieve a source eNB mapped to the target pico eNB 1506, and transfer the cell information of the target pico eNB 1506 to the retrieved source eNB, that is, the source pico eNB 1502 in step 1532, and then transmits an eNB configuration update message including the cell information of the target pico eNB 1506 to the source pico eNB 1502 in step 1534.

Then, the source pico eNB 1506 that has received the eNB configuration update message transmits an eNB configuration update ack message representing it has received the cell information of the target eNB to the pico GW 1504 in step 1536.

After that, the source pico eNB 1502 and the target pico eNB 1506 can perform an X2 handover procedure for the UE 1500.

Figure 16:
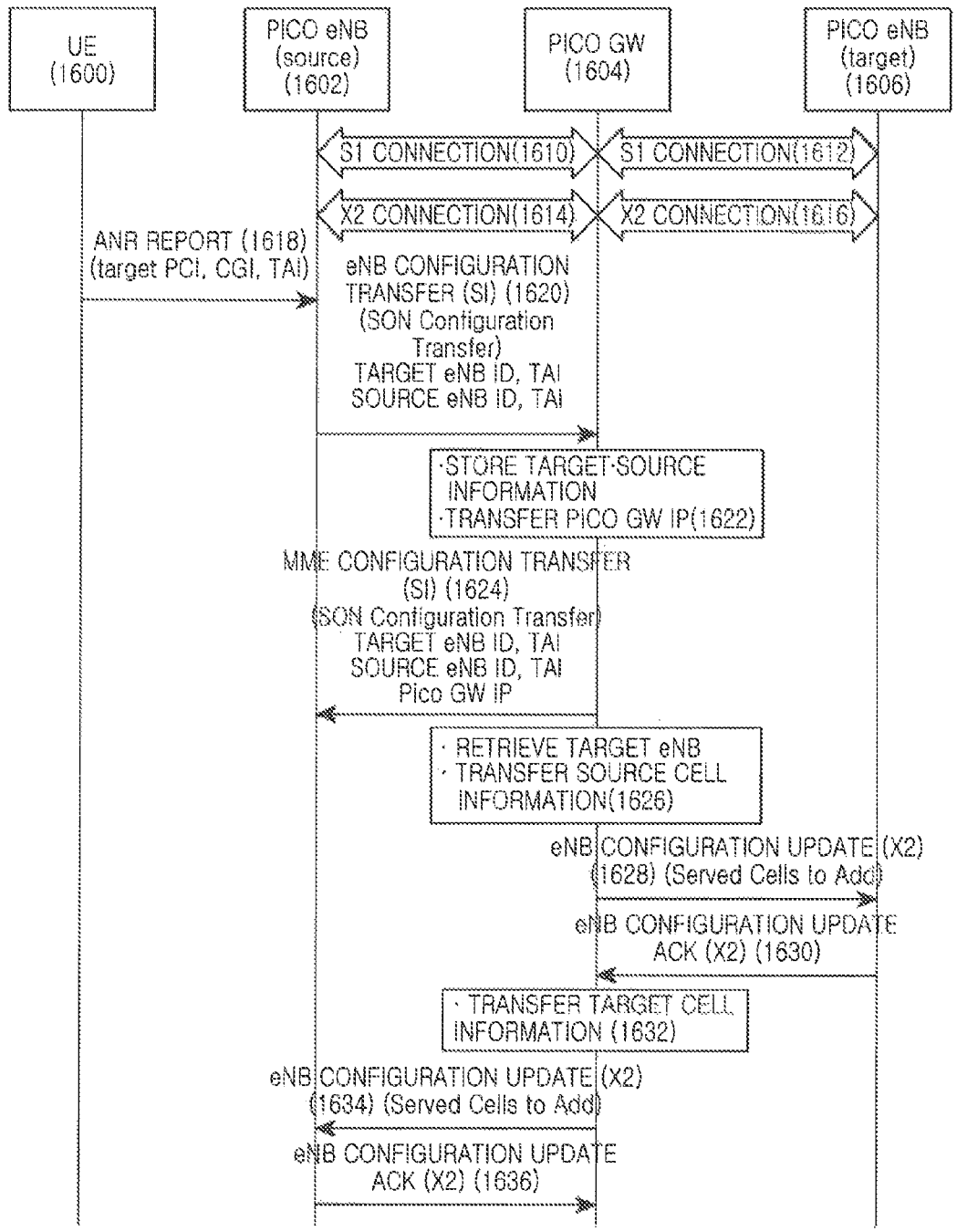

FIG. 16 illustrates a case where a source pico eNB and a pico GW are connected via the X2 interface in advance and a target pico eNB and the pico GW are connected via the X2 interface in advance in the case where the pico eNB requests X2 interface connection for the pico eNB.

Referring to FIG. 16, the pico GW 1604 performs S1 interface connection with two pico eNBs 1602 and 1606 in steps 1610 and 1612, and is connected with the two pico eNBs 1602 and 1606 via the X2 interface in advance in steps 1614 and 1616.

Here, since steps 1618 to 1624 are the same as steps 1314 to 1320 of FIG. 13, description thereof is omitted.

The pico GW 1604 transmits an MME configuration transfer message including the IP information of the pico GW 1604 to the source pico eNB 1602 in step 1624, determines to transfer the cell information of the source pico eNB 1602 to the target pico eNB 1606 in step 1626, and then proceeds to step 1628 to transmit an eNB configuration update message including the cell information representing a neighbor cell of the source pico eNB to the target pico eNB 1606 via the X2 interface connected with the target pico eNB 1606 in advance.

The target pico eNB 1606 that has received the eNB configuration update message transmits an eNB configuration update ack message representing it has received the information of the source pico eNB to the pico GW 1604 in step 1630.

After that, the pico GW 1604 determines to retrieve a source eNB mapped to the target pico eNB 1606 and transfer the cell information of the target pico eNB 1606 to the retrieved source eNB, that is, the source pico eNB 1602 in step 1632, and transmits an eNB configuration update message including the cell information of the target pico eNB 1606 to the source pico eNB 1602 in step 1634.

Then, the source pico eNB 1602 that has received the eNB configuration update message transmits an eNB configuration update ack message representing it has received the cell information of the target eNB to the pico GW 1604 in step 1636.

After that, the source pico eNB 1602 and the target pico eNB 1606 can perform an X2 handover procedure for the UE 1600.

Figure 17:
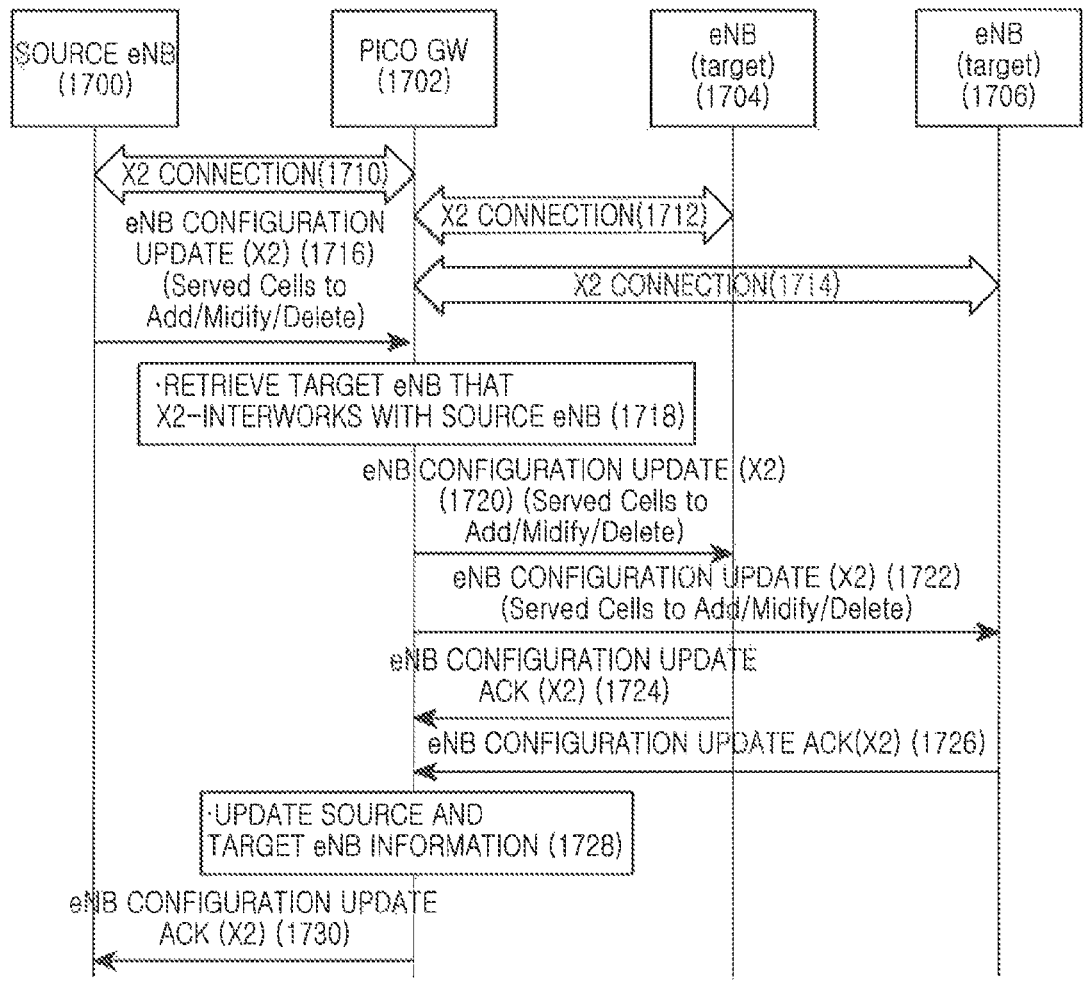
FIG. 17 is a view illustrating a method for updating cell information between eNBs that are X2 interworking in a wireless communication system having a hierarchical cell structure according to an embodiment of the present invention.

FIG. 17 illustrates a method for updating cell information between eNBs that are X2 interworking in a wireless communication system having a hierarchical cell structure according to an embodiment of the present invention. Here, the interworking eNBs may be a macro eNB and a pico eNB, and may be a pico eNB and a pico eNB.

Referring to FIG. 17, the source eNB 1700 and a pico GW 1702 are connected via the X2 interface in step 1710, the pico GW 1702 and the first target eNB 1704 are connected via the X2 interface in step 1712, and the pico GW 1702 and the second target eNB 1706 are connected via the X2 interface in step 1714. Here, it is assumed that the pico GW 1702 has mapped to represent it is interworking with the first target eNB 1704 and the second target eNB 1706 via the X2 interface according to a request of the source eNB 1700.

For updating cell information, the source eNB 1700 transmits an eNB configuration update message requesting the cell information update to the pico GW 1702 using the X2 interface connected in advance in step 1716.

After that, the pico GW 1702 retrieves target eNBs 1704 and 1706 that are interworking with the source eNB 1700 via the X2 interface in step 1718. After that, the pico GW 1702 transmits an eNB configuration update message requesting the cell information update of the source eNB to the respective target eNBs 1704 and 1706 using the X2 interface connected with the retrieved target eNBs 1704 and 1706 in advance in steps 1720 and 1722.

After that, the pico GW 1702 receives an eNB configuration update ack message from the target eNBs 1704 and 1706 as a response to the eNB configuration update message in steps 1724 and 1726, and updates the information of the source eNB 1700 and the target eNBs 1704 and 1706 in step 1728.

After that, the pico GW 1702 transmits an eNB configuration update ack message via the X2 interface as a response to the eNB configuration update message.

According to the present invention, a small GW of a wireless communication system having a hierarchical cell structure is connected with respective eNBs via one X2 interface to provide the X2 interface for a plurality of other eNBs to the respective eNBs by transmitting the IP information of the small GW instead of the IP of a counterpart eNB to the respective eNBs, and can optimize an X2 message to reduce a load by X2 interworking and a process delay time, thereby supporting a fast handover. Also, the present invention supports X2 interworking between small eNBs via a small GW to solve a security problem that may occur in case of directly performing X2 interworking between small eNBs.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method of a GateWay (GW) for X2 interwork between eNBs in a wireless communication system of a hierarchical cell structure, the method comprising:
   receiving a message requesting Internet Protocol (IP) information of a target eNB from a source eNB;
   obtaining the IP information of the target eNB;
   mapping the source eNB to the target eNB and storing the same; and
   transmitting IP information of the GW to the source eNB instead of the IP of the target eNB.

2. The method of claim 1, further comprising:
   connecting, at the GW, with the source eNB via an X2 interface; and
   connecting, at the GW, with the target eNB via the X2 interface.

3. The method of claim 2, comprising, when one of the source eNB and the target eNB is a macro eNB, transmitting/receiving a signal to/from the macro eNB using a core network before the macro eNB is connected via the X2 interface.

4. The method of claim 1, wherein the message requesting the IP information of the target eNB comprises a configuration transfer message that uses an S1 interface, and
   the configuration transfer message comprises at least one of an identifier of the source eNB, Tracking Area Identity (TAI) corresponding to the source eNB, an identifier of the target eNB, and TAI corresponding to the target eNB.

5. The method of claim 1, wherein when the target eNB comprises a pico eNB, the IP information of the target eNB is obtained via an S1 interface.

6. The method of claim 1, wherein when the target eNB comprises a macro eNB, when the relevant macro eNB is connected via the X2 interface previously, the IP information of the target eNB is obtained upon connection via the X2 interface, and when the relevant macro eNB is not connected via the X2 interface, the IP information of the target eNB is obtained by requesting the relevant macro eNB to transmit the IP information via an S1 interface.

7. The method of claim 2, further comprising:
   exchanging cell information with the source eNB and the target eNB,
   wherein right after the relevant eNB is connected via the X2 interface, the cell information is exchanged using a setup request message that uses the X2 interface, and the setup request message comprises at least one of a relevant eNB identifier, a serving cell, and neighbor cell information.

8. The method of claim 2, further comprising:
   exchanging cell information with the source eNB and the target eNB,
   wherein when the relevant eNB is connected via the X2 interface previously, the cell information is exchanged using a configuration update message that uses the X2 interface, and the configuration update message comprises neighbor cell information.

9. An apparatus of a GateWay (GW) for X2 interwork between eNBs in a wireless communication system of a hierarchical cell structure, the apparatus comprising:
   a receiver for receiving a message requesting Internet Protocol (IP) information of a target eNB from a source eNB;
   an X2 information manager for obtaining the IP information of the target eNB, mapping the source eNB to the target eNB, and storing the same; and
   a transmitter for transmitting IP information of the GW to the source eNB instead of the IP of the target eNB.

10. The apparatus of claim 9, wherein the X2 information manager controls a function for connecting the GW with the source eNB via an X2 interface, and connecting the GW with the target eNB via the X2 interface.

11. The apparatus of claim 10, wherein when one of the source eNB and the target eNB comprises a macro eNB, before the macro eNB is connected via the X2 interface, the X2 information manager controls to transmit/receive a signal to/from the macro eNB using a core network.

12. The apparatus of claim 9, wherein the message requesting the IP information of the target eNB comprises a configuration transfer message that uses an S1 interface, and
   the configuration transfer message comprises at least one of an identifier of the source eNB, Tracking Area Identity (TAI) corresponding to the source eNB, an identifier of the target eNB, and TAI corresponding to the target eNB.

13. The apparatus of claim 9, wherein when the target eNB comprises a pico eNB, the X2 information manager obtains the IP information of the target eNB via an S1 interface.

14. The apparatus of claim 9, wherein when the target eNB comprises a macro eNB, when the relevant macro eNB is connected via an X2 interface previously, the X2 information manager obtains the IP information of the target eNB upon connection via the X2 interface, and when the relevant macro eNB is not connected via the X2 interface, the X2 information manager obtains the IP information of the target eNB by requesting the relevant macro eNB to transmit the IP information via an S1 interface.

15. The apparatus of claim 10, wherein the X2 information manager controls a function for exchanging cell information with the source eNB and the target eNB, right after the relevant eNB is connected via the X2 interface, the X2 information manager exchanges the cell information using a setup request message that uses the X2 interface, and when the relevant eNB is connected via the X2 interface previously, the X2 information manager exchanges the cell information using a configuration update message that uses the X2 interface, and the setup request message comprises at least one of a relevant eNB identifier, a serving cell, and neighbor cell information, and the configuration update message comprises neighbor cell information.

* * * * *